(12) United States Patent
Shimizu

(10) Patent No.: US 7,017,551 B2
(45) Date of Patent: Mar. 28, 2006

(54) INTAKE CONTROL APPARATUS FOR INTERNAL COMBUSTION ENGINE AND METHOD THEREOF

(75) Inventor: Hirokazu Shimizu, Isesaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/079,396

(22) Filed: Mar. 15, 2005

(65) Prior Publication Data

US 2005/0205055 A1    Sep. 22, 2005

(30) Foreign Application Priority Data

Mar. 16, 2004    (JP) .............................. 2004-075133

(51) Int. Cl.
*F02D 43/00*    (2006.01)

(52) U.S. Cl. ................ 123/399; 123/90.11; 123/90.15; 73/118.1

(58) Field of Classification Search ................ 123/346, 123/361, 367, 348, 399, 90.11, 90.15, 90.16, 123/90.17; 73/116, 117.3, 118.1

See application file for complete search history.

(56) References Cited

U.S. PATENT DOCUMENTS

| | | | |
|---|---|---|---|
| 5,611,351 A * | 3/1997 | Sato et al. ................... | 600/547 |
| 6,497,212 B1 * | 12/2002 | Matsumoto et al. ........ | 123/295 |
| 6,851,409 B1 * | 2/2005 | Machida et al. ............ | 123/399 |
| 6,945,224 B1 * | 9/2005 | Yoshizawa et al. ......... | 123/346 |
| 2004/0244473 A1 * | 12/2004 | Tamura et al. ............. | 73/118.1 |

FOREIGN PATENT DOCUMENTS

JP    2001-173470 A    6/2001

* cited by examiner

*Primary Examiner*—Tony M. Argenbright
*Assistant Examiner*—Johnny H. Hoang
(74) *Attorney, Agent, or Firm*—Foley & Lardner LLP

(57) ABSTRACT

When a detection value of an intake pressure is normal, an electronically controlled throttle is controlled to attain a target intake pressure, a variable valve mechanism is controlled to attain a target intake air amount, and the control of the variable valve mechanism is corrected based on the detection value of the intake pressure. Contrary to this, when the detection value of the intake pressure is abnormal, the electronically controlled throttle is controlled to attain the target intake air amount, and also, the variable valve mechanism is controlled based on a fixed target opening characteristic.

20 Claims, 21 Drawing Sheets

INTAKE CONTROL APPARATUS FOR INTERNAL COMBUSTION ENGINE AND METHOD THEREOF

BACKGROUND OF THE INVENTION

1. Field of the Invention

The present invention relates to an intake control apparatus for an internal combustion engine, which comprises an electronically controlled throttle and a variable valve mechanism varying an opening characteristic of an intake valve, for controlling the electronically controlled throttle and the variable valve mechanism based on a target intake pressure and a target intake air amount, and a method thereof.

2. Description of the Related Art

Heretofore, there has been known an intake control apparatus for adjusting an intake air amount of an internal combustion engine by a valve timing control of an intake valve and also closing an electronically controlled throttle in the case where a negative pressure is required to be generated.

Further, Japanese Unexamined Patent Publication No. 2001-173470 discloses an apparatus for correcting closing timing of an intake valve according to a change in negative pressure by an opening control of an electronically controlled throttle.

In the above related art, a target volumetric flow ratio is corrected according to an intake pressure detected by a negative pressure sensor, and the closing timing of the intake valve is determined based on the corrected target volumetric flow ratio.

However, if the detection result indicates an abnormal value due to the failure of the negative pressure sensor or the intake pressure indicates an abnormal value due to the failure of the electronically controlled throttle or an influence by the valve deposit, the target volumetric flow ratio is erroneously corrected.

Then, if the target volumetric flow ratio is erroneously corrected, the control accuracy of the intake air amount is lowered, resulting in the degradation of drivability of the internal combustion engine.

SUMMARY OF THE INVENTION

It is therefore an object of the present invention to provide an intake control apparatus for an internal combustion engine and a method thereof, capable of avoiding that the drivability of the internal combustion engine is significantly degraded, in the case where a detection value of an intake pressure indicates an abnormal value.

In order to achieve the above object, according to the present invention;

in an apparatus for controlling an electronically controlled throttle to attain a target intake pressure, controlling a variable valve mechanism to attain a target intake air amount, and correcting the control of the variable valve mechanism based on a detection value of an intake pressure, the correction of the control of the variable valve mechanism based on the detection value of the intake pressure is limited, when it is judged that the detection value of the intake pressure is abnormal.

Further, according to the present invention, the electronically controlled throttle is controlled to attain the target intake air amount and also the variable valve mechanism is controlled based on a fixed target opening characteristic, when it is judged that the detection value of the intake pressure is abnormal.

The other objects and features of the invention will become understood from the following description with reference to the accompanying drawings.

PREFERRED EMBODIMENT

Figure 1:
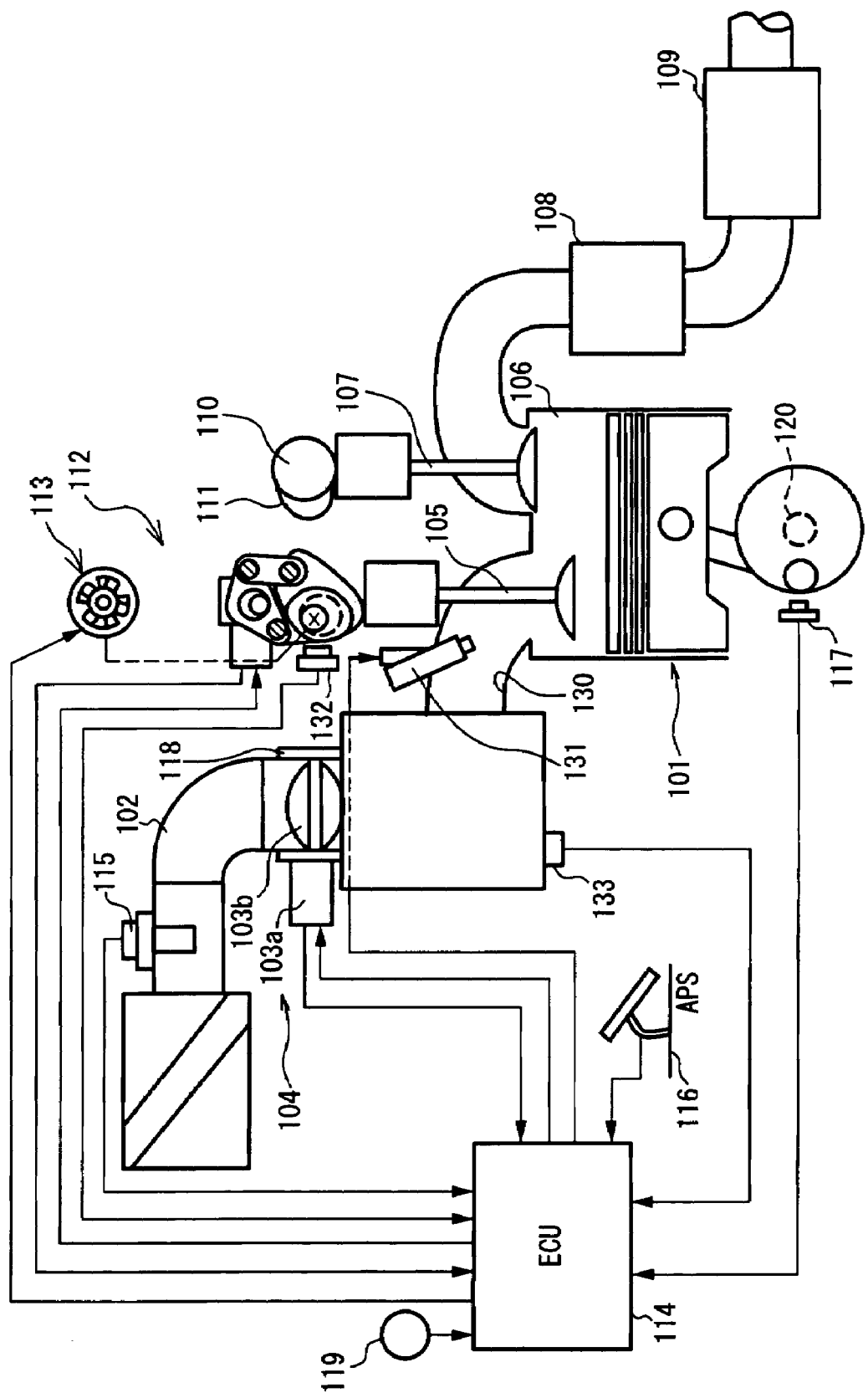
FIG. 1 is a systematic diagram of an internal combustion engine in an embodiment of the invention.

FIG. 1 is a systematic diagram of an internal combustion engine for vehicle in an embodiment of the invention.

In FIG. 1, in an intake pipe 102 of an internal combustion engine 101, an electronically controlled throttle 104 for driving a throttle valve 103b by a throttle motor 103a is disposed.

Air is sucked into a combustion chamber 106 via electronically controlled throttle 104 and an intake valve 105.

A combusted exhaust gas is discharged from combustion chamber 106 via an exhaust valve 107.

The exhaust gas discharged from combustion chamber 106 is purified by a front catalyst 108 and a rear catalyst 109, to be emitted into the atmosphere.

Exhaust valve 107 is driven by a cam 111 axially supported by an exhaust side camshaft 110, while maintaining a fixed lift amount, a fixed valve operating angle and fixed valve timing.

On the other hand, there is disposed a variable valve event and lift (VEL) mechanism 112 which continuously varies a lift amount of intake valve 105 as well as an operating angle thereof.

Further, there is disposed a variable valve timing control (VTC) mechanism 113 which changes a rotation phase of an intake side camshaft relative to a crankshaft, to continuously vary a center phase of the operating angle of intake valve 105.

VEL mechanism 112 and VTC mechanism 113 each corresponds to a variable valve mechanism in the present embodiment.

An engine control unit (ECU) 114 controls electronically controlled throttle 104, VEL mechanism 112 and VTC mechanism 113, based on a target intake air amount (target volumetric flow ratio) and a target intake pressure (target manifold pressure ratio).

ECU 114 incorporates a microcomputer therein.

ECU receives detection signals from an air flow meter 115, an accelerator pedal sensor 116, a crank angle sensor 117, a throttle sensor 118, a water temperature sensor 119, a cam sensor 132 and an intake pressure sensor 133.

Air flow meter 115 detects an intake air amount of internal combustion engine 101.

Accelerator pedal sensor 116 detects an accelerator opening.

Crank angle sensor 117 outputs a crank angle signal for each reference rotation position of a crankshaft 120.

Throttle sensor 118 detects an opening TVO of throttle valve 103*b*.

Water temperature sensor 119 detects a cooling water temperature of internal combustion engine 101.

Cam sensor 132 outputs a cam signal for each reference rotation position of a camshaft 13.

Intake pressure sensor 133 detects an intake pressure in an intake passage between throttle valve 103*b* and intake valve 105.

Further, an electromagnetic fuel injection valve 131 is disposed on an intake port 130 at the upstream side of intake valve 105.

Fuel injection valve 131 is driven to open based on an injection pulse signal from ECU 114 to inject fuel of an amount proportional to the injection pulse width of the injection pulse signal.

Figure 2:
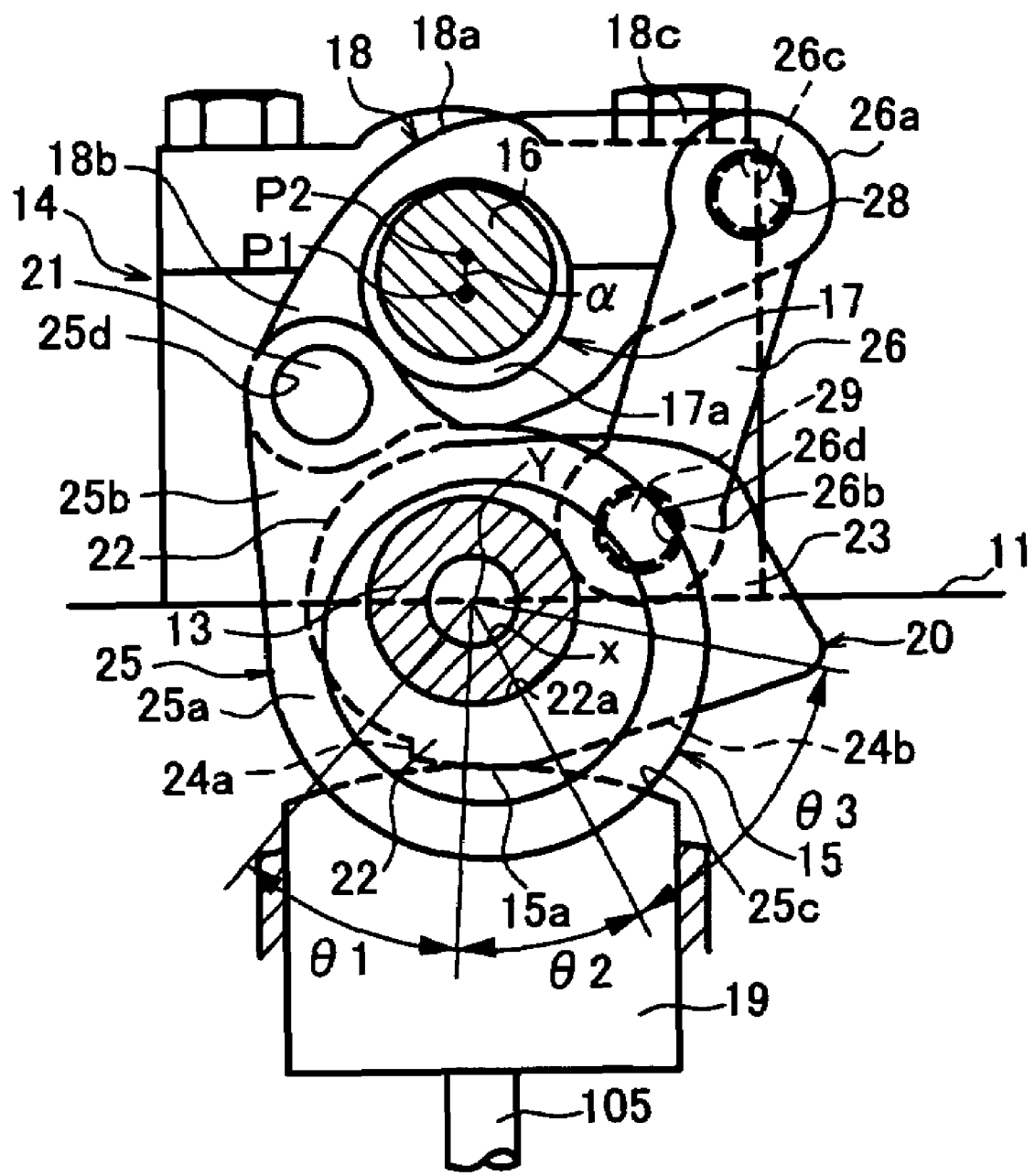
FIG. 2 is a cross section view showing a variable valve event and lift mechanism in the embodiment of the invention (A—A cross section view in FIG. 3).
Figure 3:
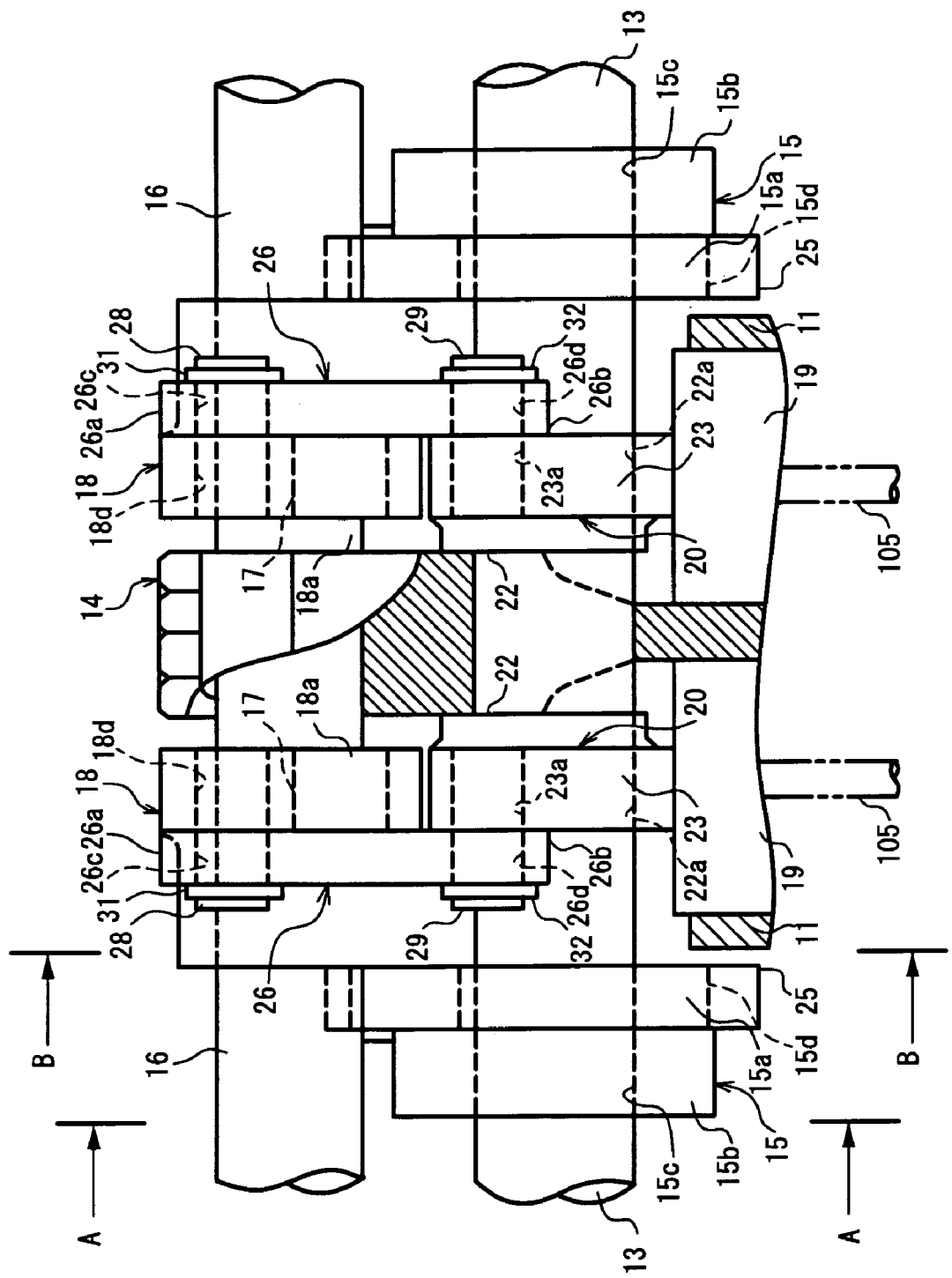
FIG. 3 is a side elevation view of the variable valve event and lift mechanism.
Figure 4:
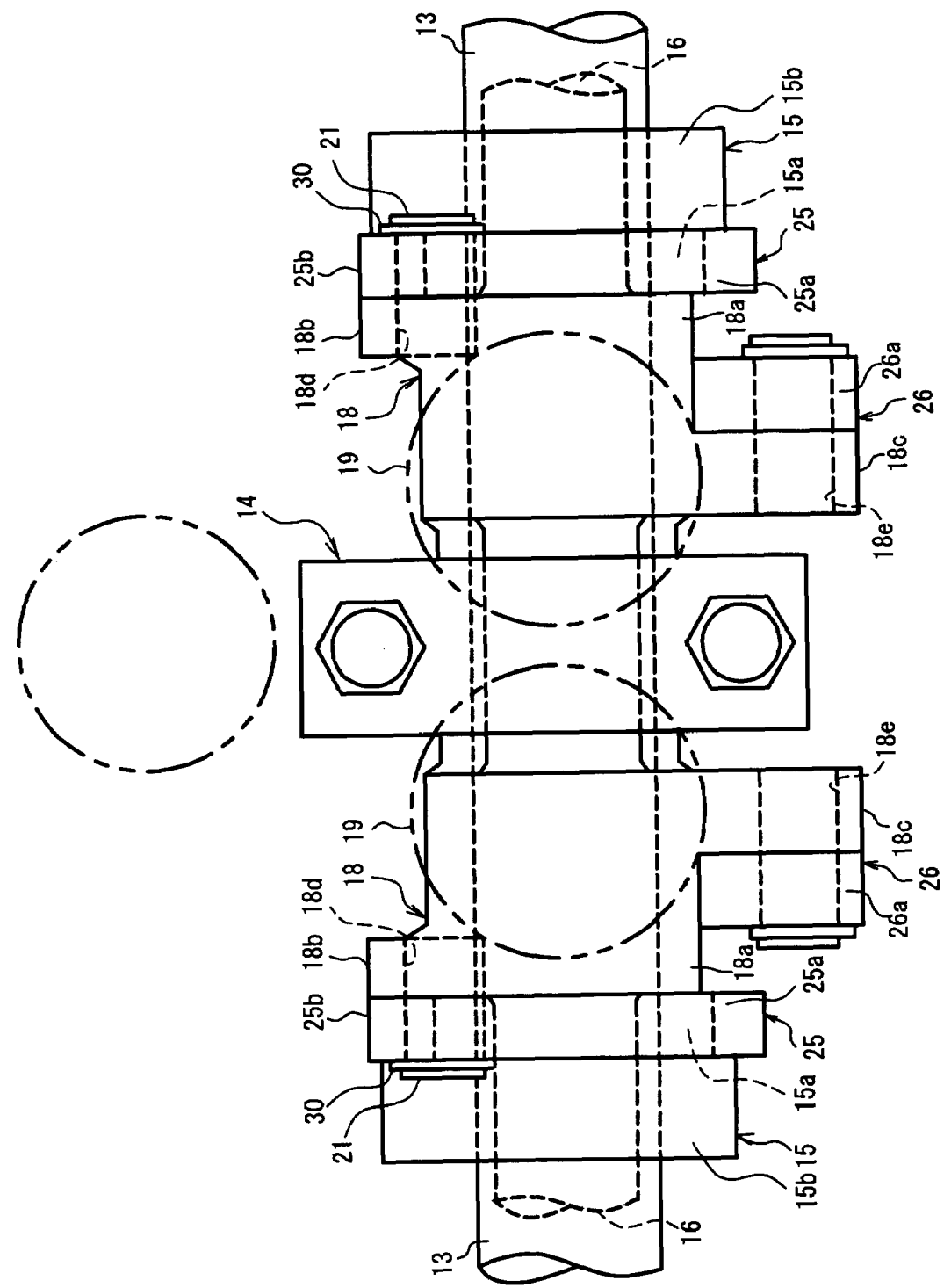
FIG. 4 is a top plan view of the variable valve event and lift mechanism.

FIG. 2 to FIG. 4 show in detail the structure of VEL mechanism 112.

VEL mechanism 112 shown in FIG. 2 to FIG. 4 includes a pair of intake valves 105, 105, hollow camshaft 13 rotatably supported by a cam bearing 14 of a cylinder head 11, two eccentric cams 15, 15 (drive cams) being rotation cams which are axially supported by camshaft 13, a control shaft 16 rotatably supported by cam bearing 14 and arranged in parallel at an upper position of camshaft 13, a pair of rocker arms 18, 18 swingingly supported by control shaft 16 through a control cam 17, and a pair of independent swing cams 20, 20 disposed to upper end portions of intake valves 105, 105 through valve lifters 19, 19, respectively.

Eccentric cams 15, 15 are connected with rocker arms 18, 18 by link arms 25, 25, respectively. Rocker arms 18, 18 are connected with swing cams 20, 20 by link members 26, 26.

Rocker arms 18, 18, link arms 25, 25, and link members 26, 26 constitute a transmission mechanism.

Figure 5:
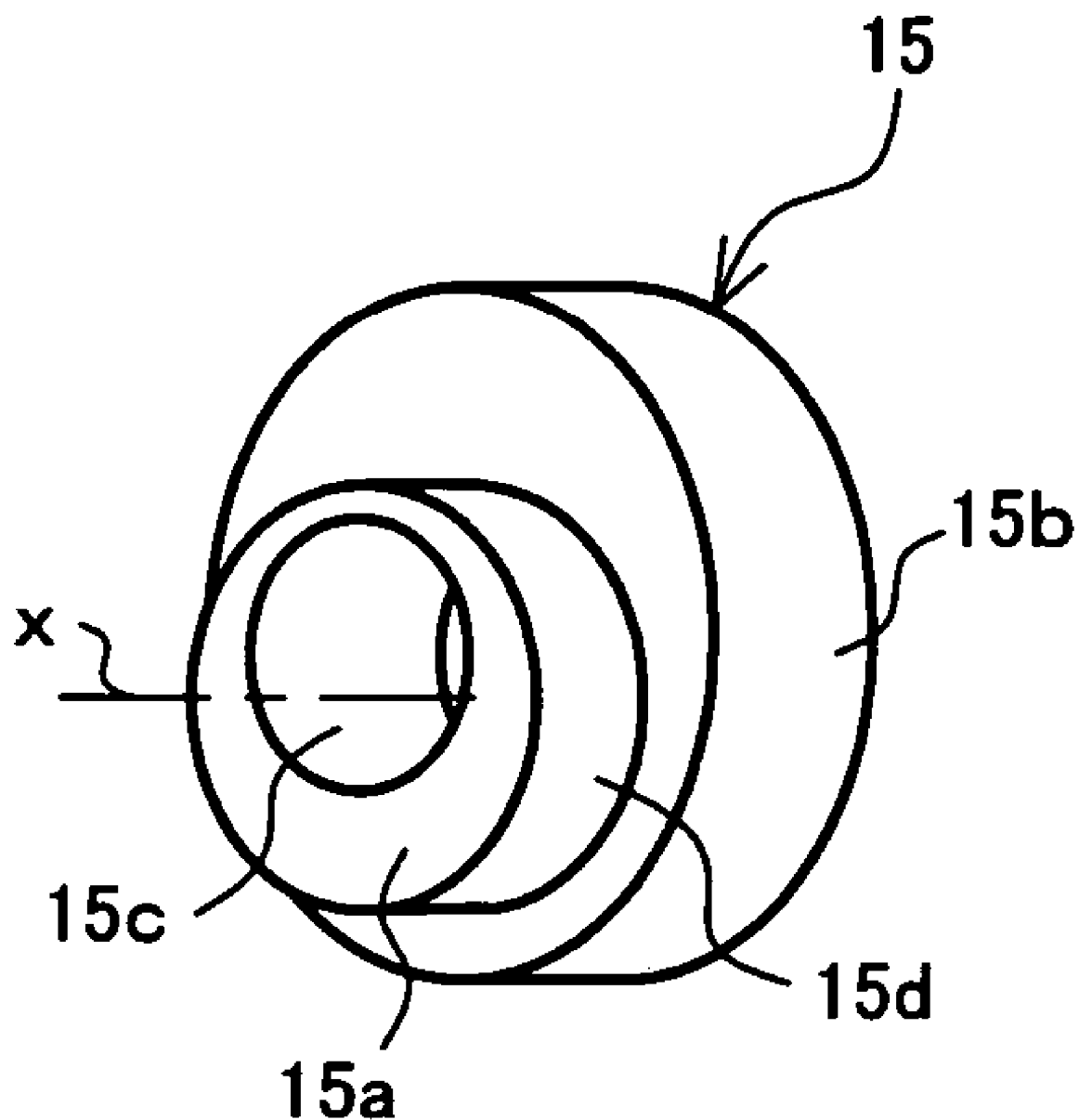
FIG. 5 is a perspective view showing an eccentric cam for use in the variable valve event and lift mechanism.

Each eccentric cam 15, as shown in FIG. 5, is formed in a substantially ring shape and includes a cam body 15*a* of small diameter, a flange portion 15*b* integrally formed on an outer surface of cam body 15*a*. A camshaft insertion hole 15*c* is formed through the interior of eccentric cam 15 in an axial direction, and also a center axis X of cam body 15*a* is biased from a center axis Y of camshaft 13 by a predetermined amount.

Eccentric cams 15, 15 are pressed and fixed to camshaft 13 via camshaft insertion holes 15*c* at outsides of valve lifters 19, 19, respectively, so as not to interfere with valve lifters 19, 19.

Each rocker arm 18, as shown in FIG. 4, is bent and formed in a substantially crank shape, and a central base portion 18*a* thereof is rotatably supported by control cam 17.

A pin hole 18*d* is formed through one end portion 18*b* which is formed to protrude from an outer end portion of base portion 18*a*. A pin 21 to be connected with a tip portion of link arm 25 is pressed into pin hole 18*d*. A pin hole 18*e* is formed through the other end portion 18*c* which is formed to protrude from an inner end portion of base portion 18*a*. A pin 28 to be connected with one end portion 26*a* (to be described later) of each link member 26 is pressed into pin hole 18*e*.

Control cam 17 is formed in a cylindrical shape and fixed to an outer periphery of control shaft 16. As shown in FIG. 2, a center axis P1 position of control cam 17 is biased from a center axis P2 position of control shaft 16 by α.

Figure 6:
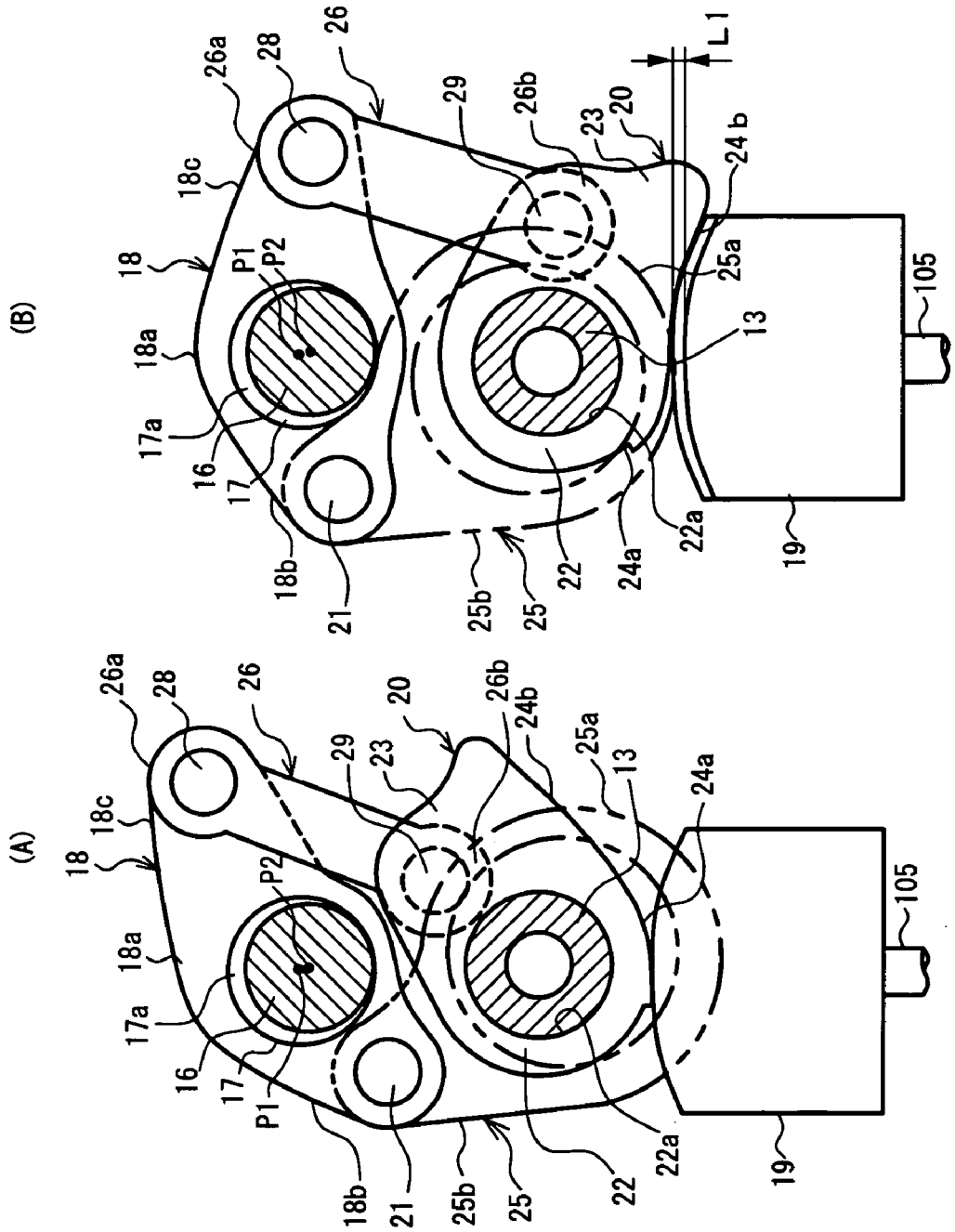
FIG. 6 is a cross section view showing a low lift condition of the variable valve event and lift mechanism (B—B cross section view of FIG. 3).
Figure 7:
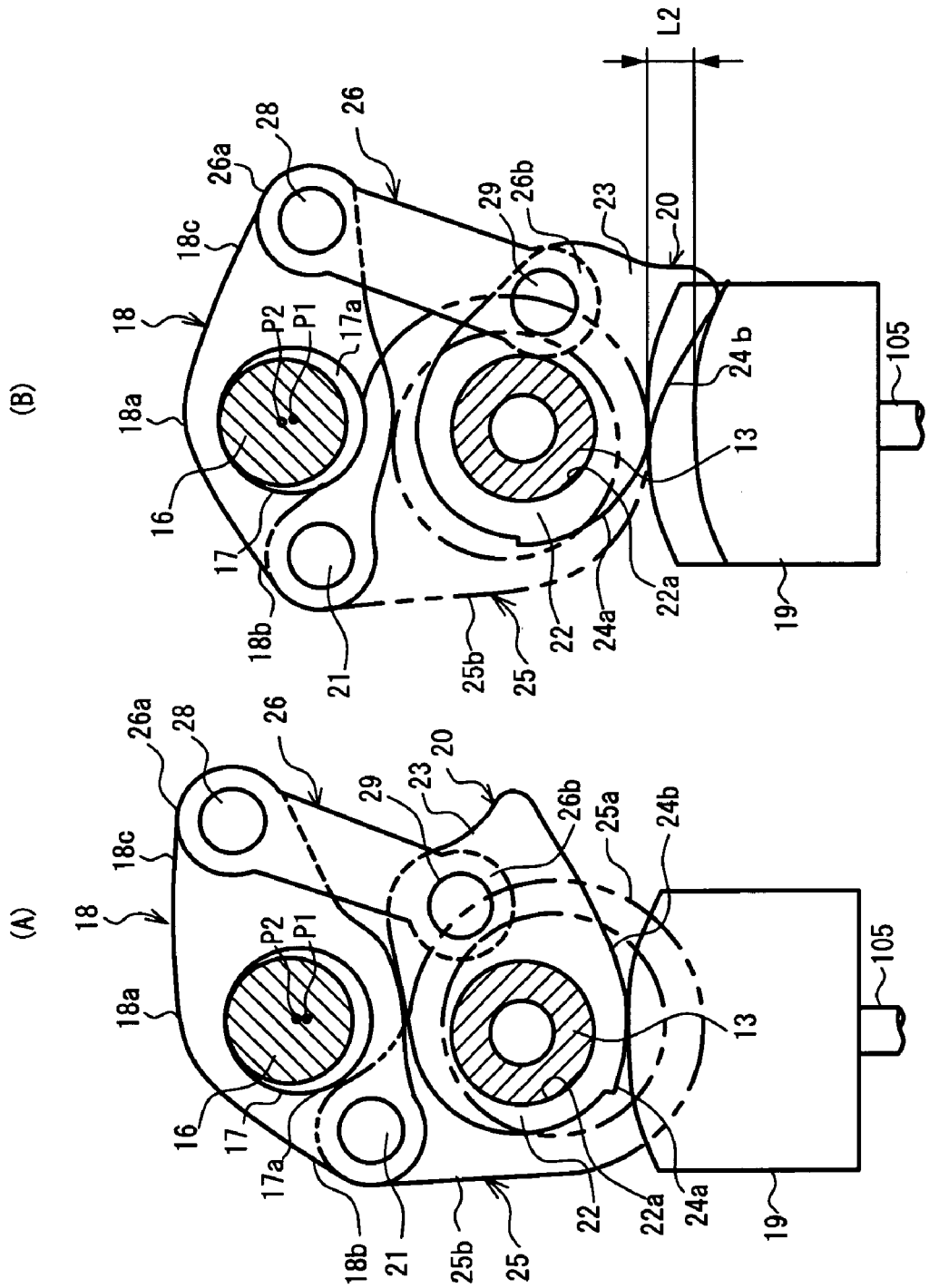
FIG. 7 is a cross section view showing a high lift condition of the variable valve event and lift mechanism (B—B cross section view of FIG. 3).

Swing cam 20 is formed in a substantially lateral U-shape as shown in FIG. 2, FIG. 6 and FIG. 7, and a supporting hole 22*a* is formed through a substantially ring-shaped base end portion 22. Camshaft 13 is inserted into supporting hole 22*a* to be rotatably supported. Also, a pin hole 23*a* is formed through an end portion 23 positioned at the other end portion 18*c* of rocker arm 18.

A base circular surface 24*a* of base end portion 22 side and a cam surface 24*b* extending in an arc shape from base circular surface 24*a* to an edge of end portion 23, are formed on a bottom surface of swing cam 20. Base circular surface 24*a* and cam surface 24*b* are in contact with a predetermined position of an upper surface of each valve lifter 19 corresponding to a swing position of swing cam 20.

Figure 8:
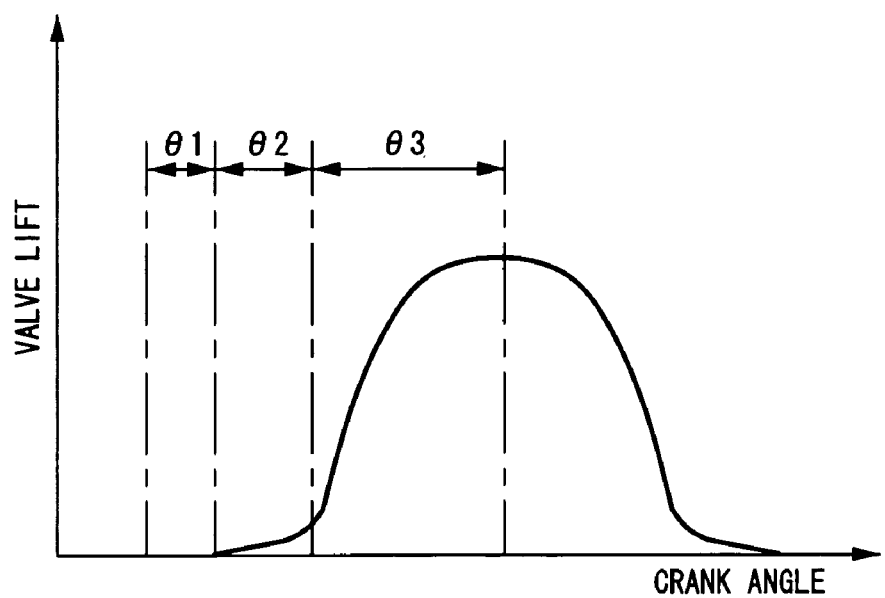
FIG. 8 is a graph showing a lift characteristic of an intake valve in the variable valve characteristic mechanism.

Namely, according to a valve lift characteristic shown in FIG. 8, as shown in FIG. 2, a predetermined angle range θ1 of base circular surface 24*a* is a base circle interval and a range of from base circle interval θ1 of cam surface 24*b* to a predetermined angle range θ2 is a so-called ramp interval, and a range of from ramp interval θ2 of cam surface 24*b* to a predetermined angle range θ3 is a lift interval.

Link arm 25 includes a ring-shaped base portion 25*a* and a protrusion end 25*b* protrudingly formed on a predetermined position of an outer surface of base portion 25*a*. A fitting hole 25*c* to be rotatably fitted with the outer surface of cam body 15*a* of eccentric cam 15 is formed on a central position of base portion 25*a*. Also, a pin hole 25*d* into which pin 21 is rotatably inserted is formed through protrusion end 25*b*.

Link member 26 is formed in a linear shape of predetermined length and pin insertion holes 26*c*, 26*d* are formed through both circular end portions 26*a*, 26*b*. End portions of pins 28, 29 pressed into pin hole 18*d* of the other end portion 18*c* of rocker arm 18 and pin hole 23*a* of end portion 23 of swing cam 20, respectively, are rotatably inserted into pin insertion holes 26*c*, 26*d*.

Snap rings 30, 31, 32 restricting axial transfer of link arm 25 and link member 26 are disposed on respective end portions of pins 21, 28, 29.

In such a constitution, depending on a positional relation between the center axis P2 of control shaft 16 and the center axis P1 of control cam 17, as shown in FIG. 6 and FIG. 7, the valve lift amount is varied, and by driving control shaft 16 to rotate, the position of the center axis P2 of control shaft 16 relative to the center axis P1 of control cam 17 is changed.

Figure 9:
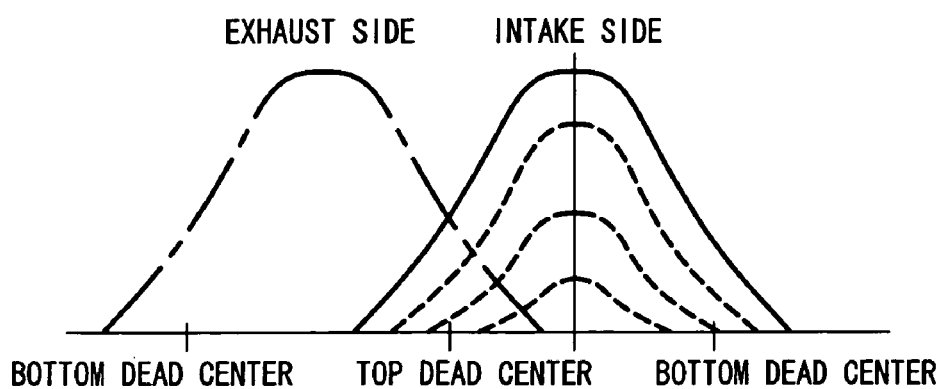
FIG. 9 is a graph showing a correlation between an operating angle and a lift amount in the variable valve event and lift mechanism.
Figure 10:
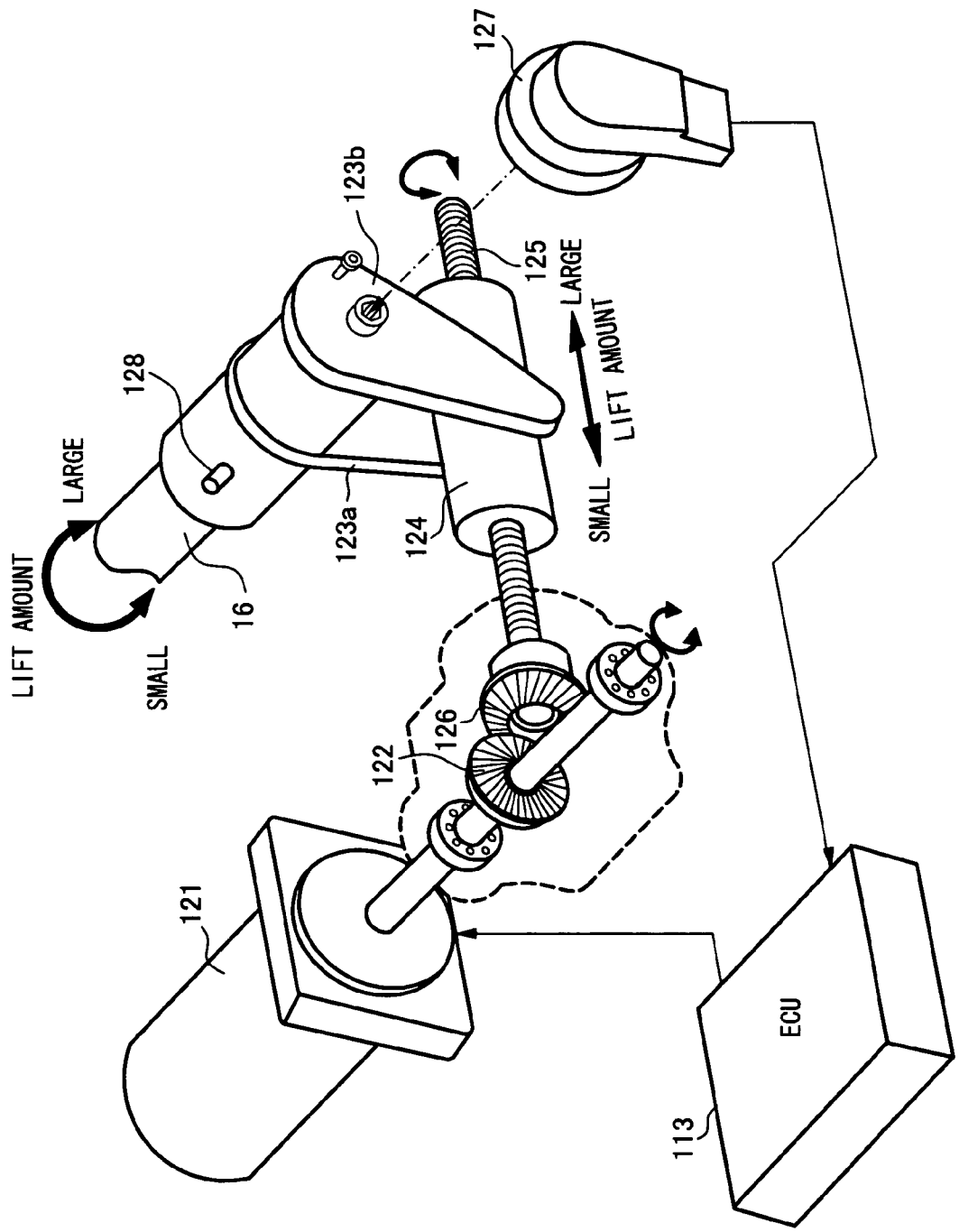
FIG. 10 is a perspective view showing a driving mechanism of a control shaft in the variable valve event and lift mechanism.

Control shaft 16 is driven to rotate within a predetermined rotation angle range, which is restricted by a stopper, by a DC servo motor (actuator) 121 as shown in FIG. 10. By varying a rotation angle of control shaft 16 by actuator 121, the lift amount and operating angle of each of intake valves 105, 105 are continuously varied within a variable range between a maximum valve lift amount and a minimum valve lift amount, which is restricted by the stopper (refer to FIG. 9).

In FIG. 10, DC servo motor 121 is arranged so that a rotation shaft thereof is parallel to control shaft 16, and a bevel gear 122 is axially supported by a tip portion of the rotation shaft.

On the other hand, a pair of stays 123*a*, 123*b* is fixed to the tip end of control shaft 16. A nut 124 is swingingly supported around an axis parallel to control shaft 16 connecting tip portions of the pair of stays 123*a*, 123*b*.

A bevel gear 126 meshed with bevel gear 122 is axially supported at a tip end of a threaded rod 125 engaged with nut 124. Threaded rod 125 is rotated by the rotation of DC servo motor 121, and the position of nut 124 engaged with threaded rod 125 is displaced in an axial direction of threaded rod 125, so that control shaft 16 is rotated.

Here, the valve lift amount is decreased as the position of nut 124 approaches bevel gear 126, while the valve lift amount is increased as the position of nut 124 gets away from bevel gear 126.

Further, a potentiometer type angle sensor 127 detecting the angle of control shaft 16 is disposed on the tip end of control shaft 16, as shown in FIG. 10. ECU 114 feedback controls DC servo motor 121 so that an actual angle detected by angle sensor 127 coincides with a target angle (a value equivalent to a target valve lift amount).

When a stopper member 128 formed to protrude from the outer periphery of control shaft 16 is in contact with a receiving member on the fixing side (not shown in the figure) in both of a valve lift increasing direction and a valve lift decreasing direction, the rotation range of control shaft 16 is restricted, and as a result, the maximum valve lift amount and the minimum valve lift amount are restricted.

Figure 11:
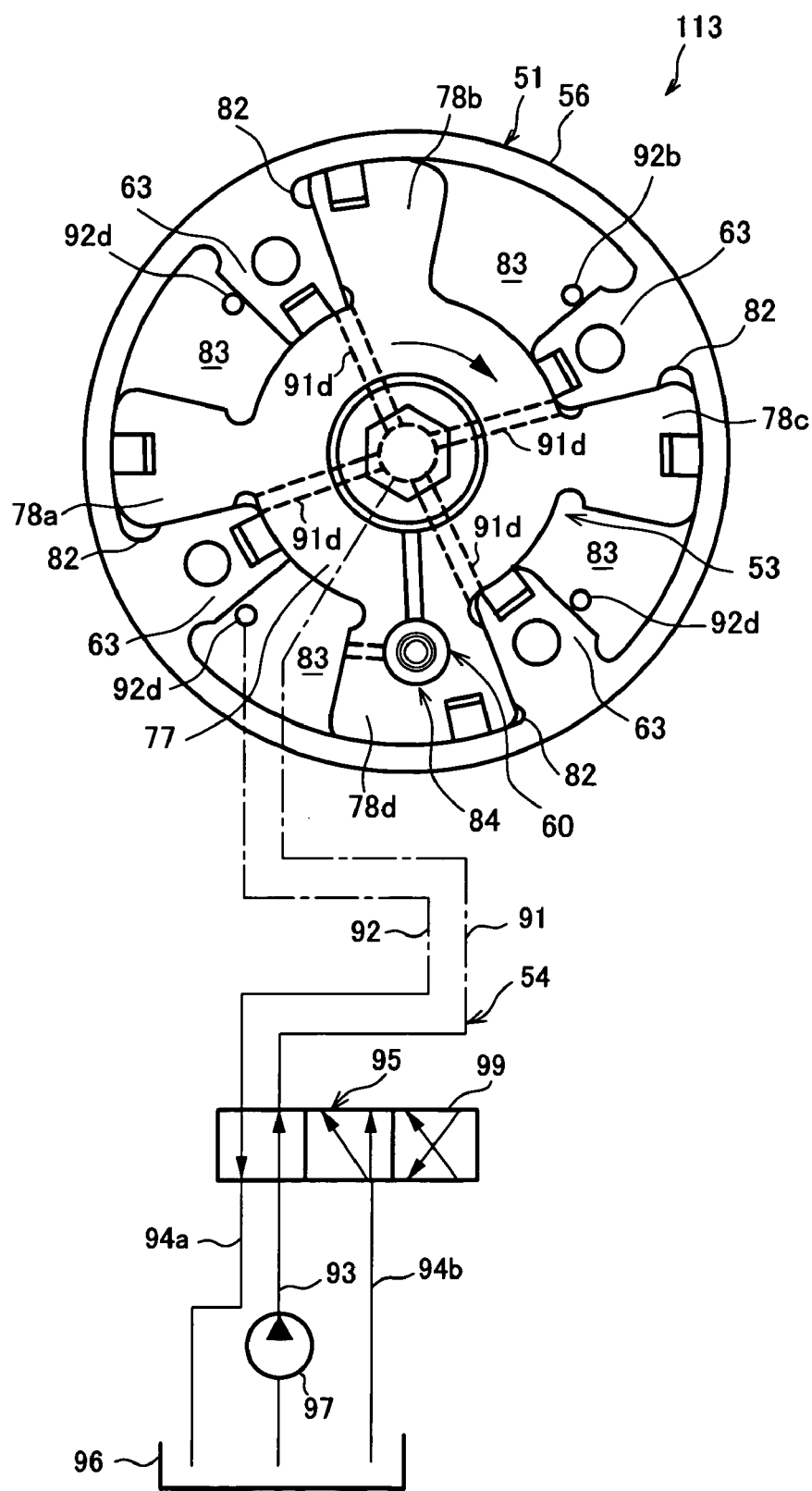
FIG. 11 is a cross sectional view showing a variable valve timing mechanism in the embodiment of the invention.

Next, the structure of VTC mechanism 113 will be described based on FIG. 11.

VTC mechanism 113 in the present embodiment is a so-called vane type variable valve timing mechanism, and comprises: a cam sprocket 51 (timing sprocket) which is rotatably driven by crankshaft 120 via a timing chain; a rotation member 53 secured to an end portion of intake side camshaft 13 and rotatably housed inside cam sprocket 51; a hydraulic circuit 54 which relatively rotates rotation member 53 with respect to cam sprocket 51; and a lock mechanism 60 which selectively locks a relative rotation position between cam sprocket 51 and rotation member 53 at predetermined positions.

Cam sprocket 51 comprises: a rotation portion (not shown in the figure) having on an outer periphery thereof, teeth for engaging with the timing chain (or timing belt); a housing 56 located forward of the rotation portion, for rotatably housing rotation member 53; and a front cover and a rear cover (not shown in the figure) for closing front and rear openings of housing 56.

Housing 56 presents a cylindrical shape formed with both front and rear ends open and with four partition portions 63 protrudingly provided at positions on the inner peripheral face at 90° in the circumferential direction, four partition portions 63 presenting a trapezoidal shape in transverse section and being respectively provided along the axial direction of housing 56.

Rotation member 53 is secured to the front end portion of intake side camshaft 14 and comprises an annular base portion 77 having four vanes 78*a*, 78*b*, 78*c*, and 78*d* provided on an outer peripheral face of base portion 77 at 90° in the circumferential direction.

First through fourth vanes 78*a* to 78*d* present respectively cross-sections of approximate trapezoidal shapes. The vanes are disposed in recess portions between each partition portion 63 so as to form spaces in the recess portions to the front and rear in the rotation direction. Advance angle side hydraulic chambers 82 and retarded angle side hydraulic chambers 83 are thus formed.

Lock mechanism 60 has a construction such that a lock pin 84 is inserted into an engagement hole (not shown in the figure) at a rotation position (in the reference operating condition) on the maximum retarded angle side of rotation member 53.

Hydraulic circuit 54 has a dual system oil pressure passage, namely a first oil pressure passage 91 for supplying and discharging oil pressure to advance angle side hydraulic chambers 82, and a second oil pressure passage 92 for supplying and discharging oil pressure to retarded angle side hydraulic chambers 83. To these two oil pressure passages 91 and 92 are connected a supply passage 93 and drain passages 94*a* and 94*b*, respectively, via an electromagnetic switching valve 95 for switching the passages.

An engine driven oil pump 97 for pumping oil in an oil pan 96 is provided in supply passage 93, and the downstream ends of drain passages 94*a* and 94*b* are communicated with oil pan 96.

First oil pressure passage 91 is formed substantially radially in a base 77 of rotation member 53, and connected to four branching paths 91*d* communicating with each advance angle side hydraulic chamber 82. Second oil pressure passage 92 is connected to four oil galleries 92*d* opening to each retarded angle side hydraulic chamber 83.

In electromagnetic switching valve 95, an internal spool valve thereof is arranged so as to relatively control the switching between respective oil pressure passages 91 and 92, and supply passage 93 and drain passages 94*a* and 94*b*.

ECU 114 controls the power supply quantity for an electromagnetic actuator 99 which drives electromagnetic switching valve 95, based on a duty control signal superimposed with a dither signal.

For example, when a control signal of duty ratio 0% (OFF signal) is output to electromagnetic actuator 99, the hydraulic fluid pumped from oil pump 47 is supplied to retarded angle side hydraulic chambers 83 via second oil pressure passage 92, and the hydraulic fluid in advance angle side hydraulic chambers 82 is discharged into oil pan 96 from first drain passage 94*a* via first oil pressure passage 91.

Consequently, an inner pressure of retarded angle side hydraulic chambers 83 becomes a high pressure while an inner pressure of advance angle side hydraulic chambers 82 becomes a low pressure, and rotation member 53 is rotated to the most retarded angle side by means of vanes 78a to 78d. The result of this is that a valve opening period (valve opening time and valve closing time) of intake valve 105 is delayed.

On the other hand, when a control signal of duty ratio 100% (ON signal) is output to electromagnetic actuator 99, the hydraulic fluid is supplied to inside of advance angle side hydraulic chambers 82 via first oil pressure passage 91, and the hydraulic fluid in retarded angle side hydraulic chambers 83 is discharged into oil pan 96 via second oil pressure passage 92 and second drain passage 94b, so that the inner pressure of retarded angle side hydraulic chambers 83 become a low pressure.

Therefore, rotation member 53 is rotated to the full to the advance angle side by means of vanes 78a to 78d. As a result, the opening period (opening time and closing time) of intake valve 105 is advanced.

The configuration of the variable valve mechanism is not limited to VEL mechanism 112 or VTC mechanism 113, of the above configuration.

Next, there will be described, in detail, controls of electronically controlled throttle 104, VEL mechanism 112 and VTC mechanism 113.

Figure 12:
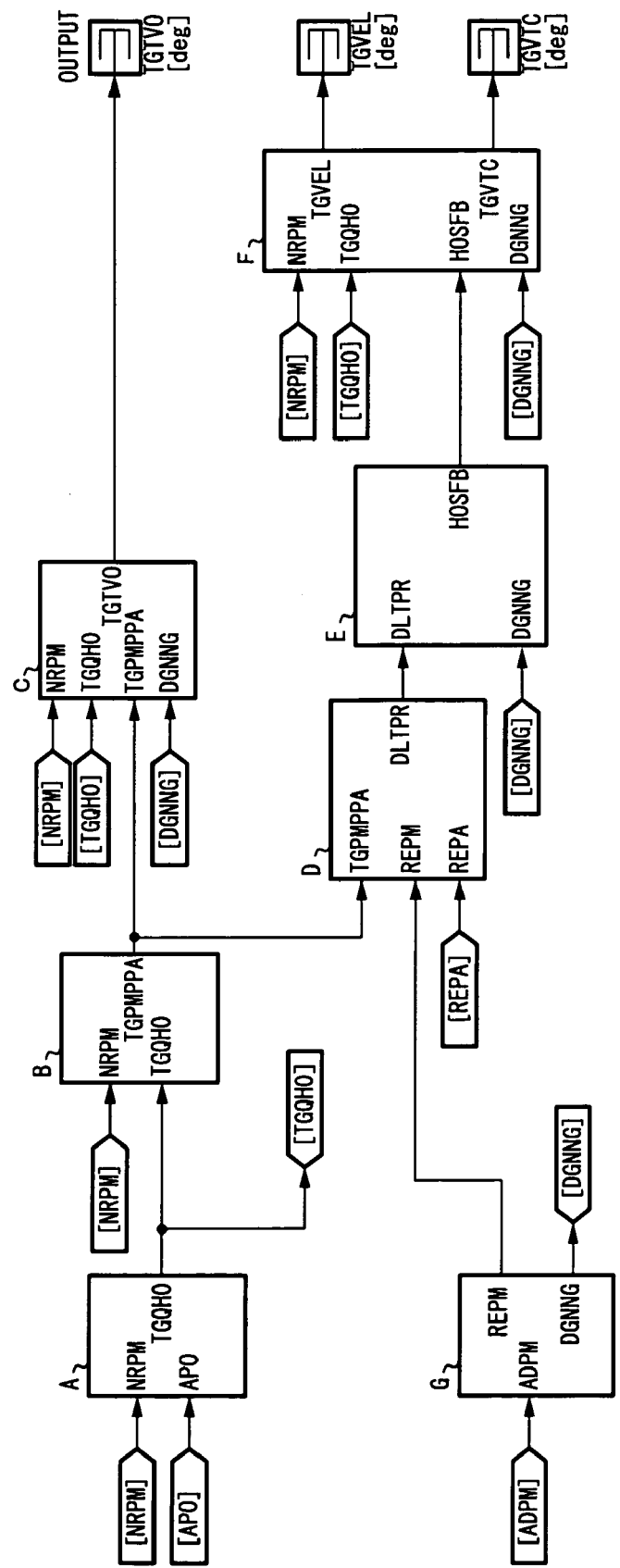
FIG. 12 is a block diagram showing controls of an electronically controlled throttle and an intake valve in a first embodiment of the invention.

FIG. 12 is a block diagram showing functions of controlling electronically controlled throttle 104, VEL mechanism 112 and VTC mechanism 113.

In FIG. 12, in a target volumetric flow ratio computing section A, a target volumetric flow ratio TGQH0 (target intake air amount) is computed, based on an engine rotation speed NRPM and an accelerator opening APO.

In a target manifold pressure ratio computing section B, a target manifold pressure ratio TGPM (target intake pressure) is computed, based on the engine rotation speed NRPM and the target volumetric flow ratio TGQH0 computed in target volumetric flow ratio computing section A.

The target manifold pressure ratio TGPM is a target value of "intake manifold pressure/atmospheric pressure".

In a target throttle opening computing section C, a target throttle opening TGTVO is computed, based on the engine rotation speed NRPM, the target volumetric flow ratio TGQH0, the target manifold pressure ratio TGPM, and a diagnosis information signal DGNNG of intake pressure sensor 133.

The diagnosis information signal DGNNG is computed in a detection and diagnosis section G to be described later.

ECU 114 feedback controls throttle motor 103a of electronically controlled throttle 104, so that an actual throttle opening is coincident with the target throttle opening TGTVO.

In a control deviation computing section D, the deviation DLTPR between the target manifold pressure ratio TGPM and an actual manifold pressure ratio is computed, based on the target manifold pressure ratio TGPM, an intake manifold pressure REPM detected by intake pressure sensor 133, and the atmospheric pressure REPA.

In a feedback control section E, a feedback correction amount HOSFB for correcting closing timing of intake valve 105 is computed, based on the deviation DLTPR and the diagnosis information signal DGNNG.

In a target VEL and VTC computing section F, a control target TGVEL of VEL mechanism 112 and a control target TGVTC of VTC mechanism 113 are computed, based on the engine rotation speed NRPM, the target volumetric flow ratio TGQH0, the feedback correction amount HOSFB and the diagnosis information signal DGNNG.

ECU 114 feedback controls VEL mechanism 112 based on the control target TGVEL, and feedback controls VTC mechanism 113 based on the control target TGVTC.

Detection and diagnosis section G converts an output ADPM of intake pressure sensor 133 into the intake manifold pressure REPM, and also performs the failure diagnosis of intake pressure sensor 133 based on the output ADPM, to output the diagnosis information signal DGNNG indicating whether or not intake pressure sensor 133 is failed.

Figure 13:
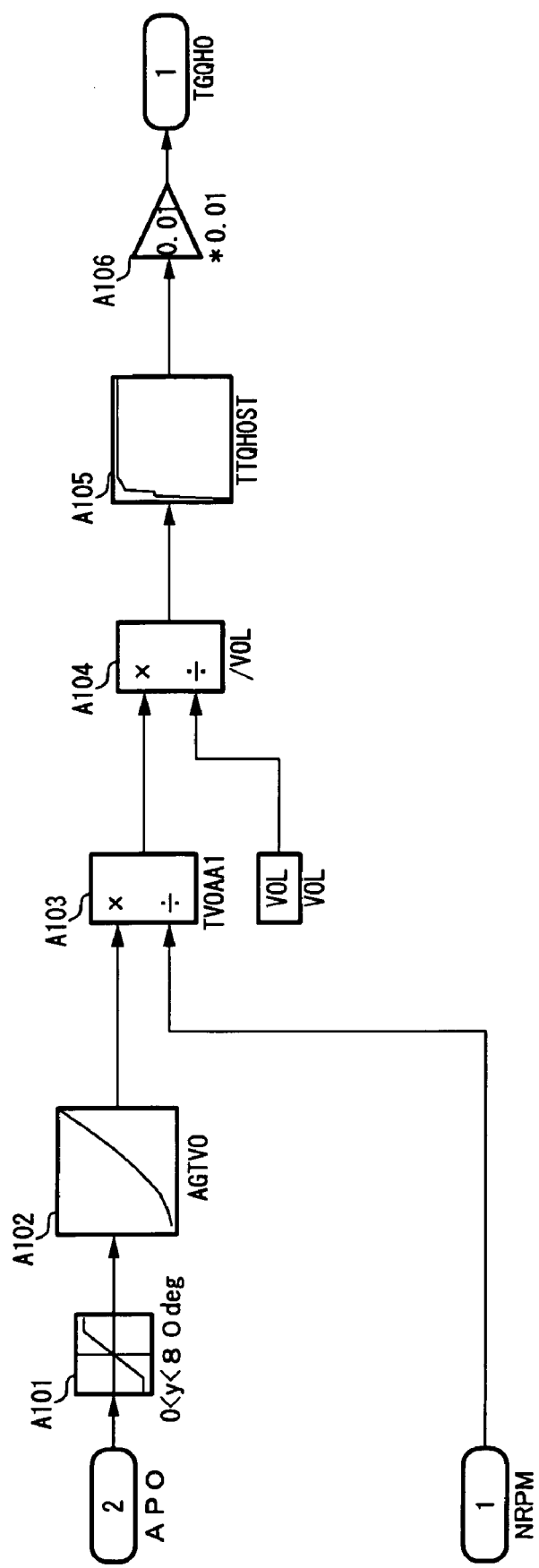
FIG. 13 is a block diagram showing the detail of a target volumetric flow ratio computing section A.

The detail of target volumetric flow ratio computing section A is shown in FIG. 13.

The detection result of the accelerator opening APO is limited to angle data within 0 to 80 degrees, in a limiter processing section A101. Thereafter, the accelerator opening data is converted into a target throttle opening area equivalent value AGTVO, in a conversion section A102.

The target throttle opening area equivalent value AGTVO is divided by the engine rotation speed NRPM, in a dividing section A103.

The dividing result in dividing section A103 is further divided by the piston displacement VOL, in a dividing section A104.

The result obtained by dividing the target throttle opening area equivalent value AGTVO by the engine rotation speed NRPM and the piston displacement VOL is converted into a target volumetric flow ratio equivalent value (%), in a volumetric flow ratio conversion section A105.

A unit of the target volumetric flow ratio equivalent value (%) is converted in a unit conversion section A106.

Figure 14:
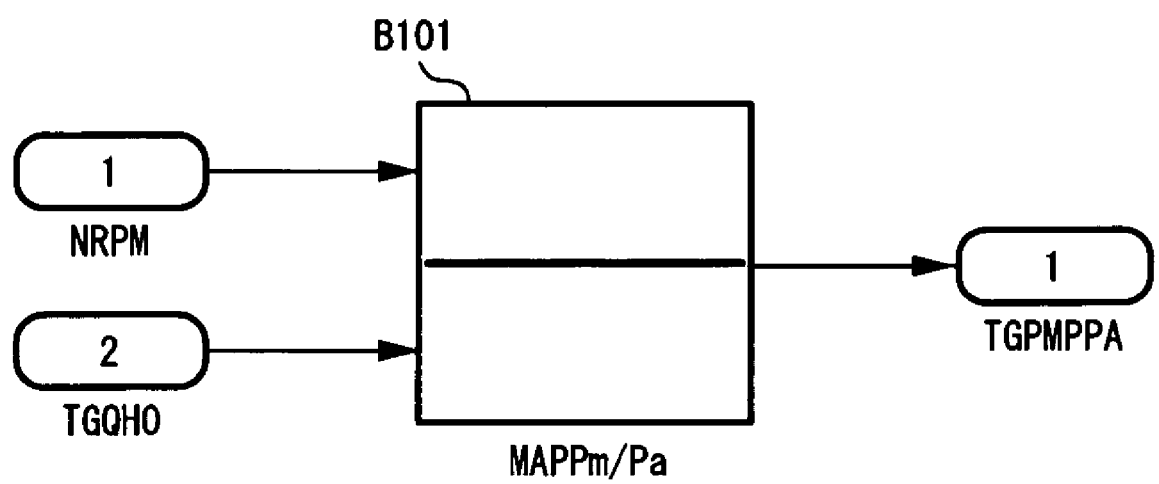
FIG. 14 is a block diagram showing the detail of a target manifold pressure ratio computing section B.

The detail of target manifold pressure ratio computing section B is shown in FIG. 14.

A conversion map B101 is provided with a map previously storing therein the target manifold pressure ratio TGPM corresponding to the engine rotation speed NRPM and the target volumetric flow ratio TGQH0.

Then, conversion map B101 outputs the target manifold pressure ratio TGPM corresponding to input values of the engine rotation speed NRPM and the target volumetric flow ratio TGQH0.

Figure 15:
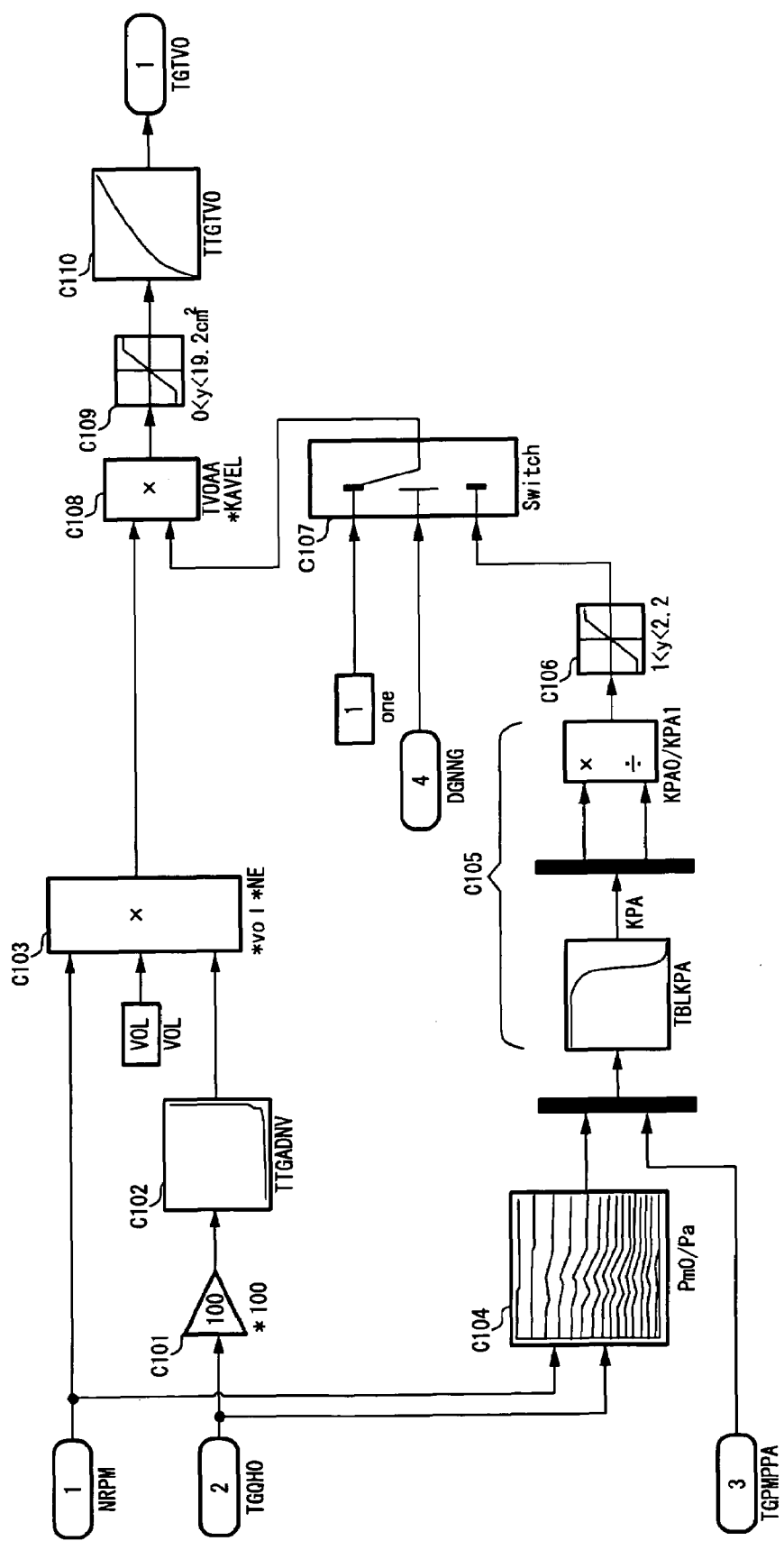
FIG. 15 is a block diagram showing the detail of a target throttle opening computing section C.

The detail of target throttle opening computing section C is shown in FIG. 15.

The target volumetric flow ratio equivalent value output from target volumetric flow ratio computing section A is again converted into a target volumetric flow ratio equivalent value (%), in a unit conversion section C101.

The target volumetric flow ratio equivalent value (%) is converted into a value corresponding to the result obtained by dividing the throttle opening area equivalent value by the engine rotation speed NRPM and the piston displacement VOL, in a volumetric flow ratio conversion section C102.

Then, in a multiplying section C103, the engine rotation speed NRPM and the piston displacement VOL are multiplied on an output of volumetric flow ratio conversion section C102, to obtain a target opening area equivalent value.

On the other hand, in a manifold pressure ratio setting section C104, a manifold pressure ratio for when the opening characteristic of intake valve 105 is coincident with a reference characteristic is set, based on the engine rotation speed NRPM and the target volumetric flow ratio TGQH0.

In a correction coefficient computing section C105, a correction value KAVEL is computed, based on the manifold pressure ratio obtained in manifold pressure ratio setting section C104, the target manifold pressure ratio TGPM or the like.

As described later, the target opening area equivalent value is corrected based on the correction value KAVEL, to obtain a target opening area equivalent value for obtaining the target manifold pressure ratio based on the opening characteristic of intake valve 105 at the time.

In a limiter processing section C106, the process of limiting the correction value KAVEL within a predetermined range.

The correction value KAVEL which is subjected to the limiter process in limiter processing section C106, is output to a selecting section C107.

In selecting section C107, the correction value KAVEL passed through limiter processing section C106 is output, when it is judged based on the diagnosis information signal DGNNG that intake pressure sensor 133 is normal.

On the other hand, "1" for avoiding the substantial correction is output as the correction value KAVEL, when it is judged based on the diagnosis information signal DGNNG that intake pressure sensor 133 is failed.

The output of selecting section C107 is output to a multiplying section C108, to be multiplied on the target opening area equivalent value output from volumetric flow ratio conversion section C102.

Then, an output of multiplying section C108 is limited within a predetermined range, in a limiter processing section C109, and thereafter, is converted into the target throttle opening TGTVO, in an opening conversion section C110.

As a result, when intake pressure sensor 133 is normal, the opening of throttle valve 103b is feedforward controlled, so that the target manifold pressure is obtained.

On the other hand, when intake pressure sensor 133 is failed, as described later, the opening characteristic of intake valve 105 is fixed to the reference characteristic, and a volumetric flow ratio is controlled to the target volumetric flow ratio by throttle valve 103b.

Accordingly, when intake pressure sensor 133 is failed, the correction of the target opening area equivalent value based on the correction value KAVEL is not necessary.

Therefore, when intake pressure sensor 133 is failed, selecting section C107 outputs "1" as the correction value KAVEL, to inhibit the correction of the target opening area equivalent value according to the target manifold pressure ratio.

Figure 16:
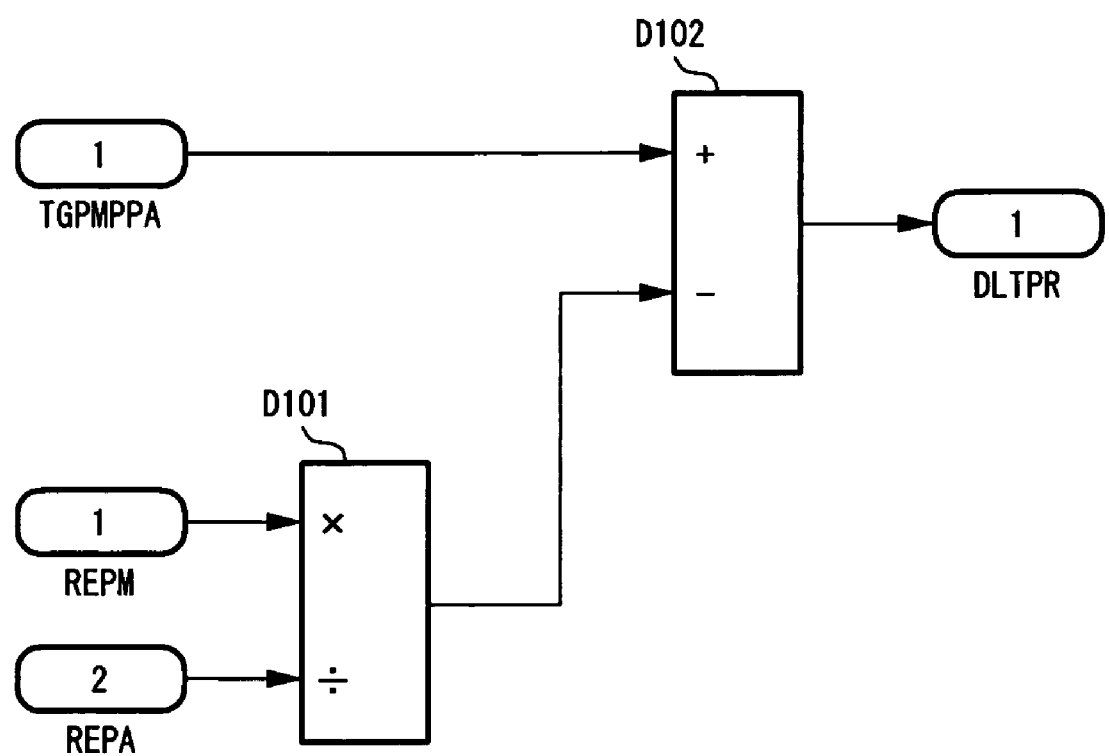
FIG. 16 is a block diagram showing the detail of a control deviation computing section D.

The detail of control deviation computing section D is shown in FIG. 16.

In an actual manifold pressure ratio computing section D101, an actual manifold pressure ratio is computed, based on the actual intake manifold pressure REPM detected by intake pressure sensor 133 and the atmospheric pressure REPA.

actual manifold pressure ratio=actual intake manifold pressure/atmospheric pressure In a deviation computing section D102, the deviation DLTPR between the target manifold pressure ratio TGPM and the actual manifold pressure ratio is computed.

Figure 17:
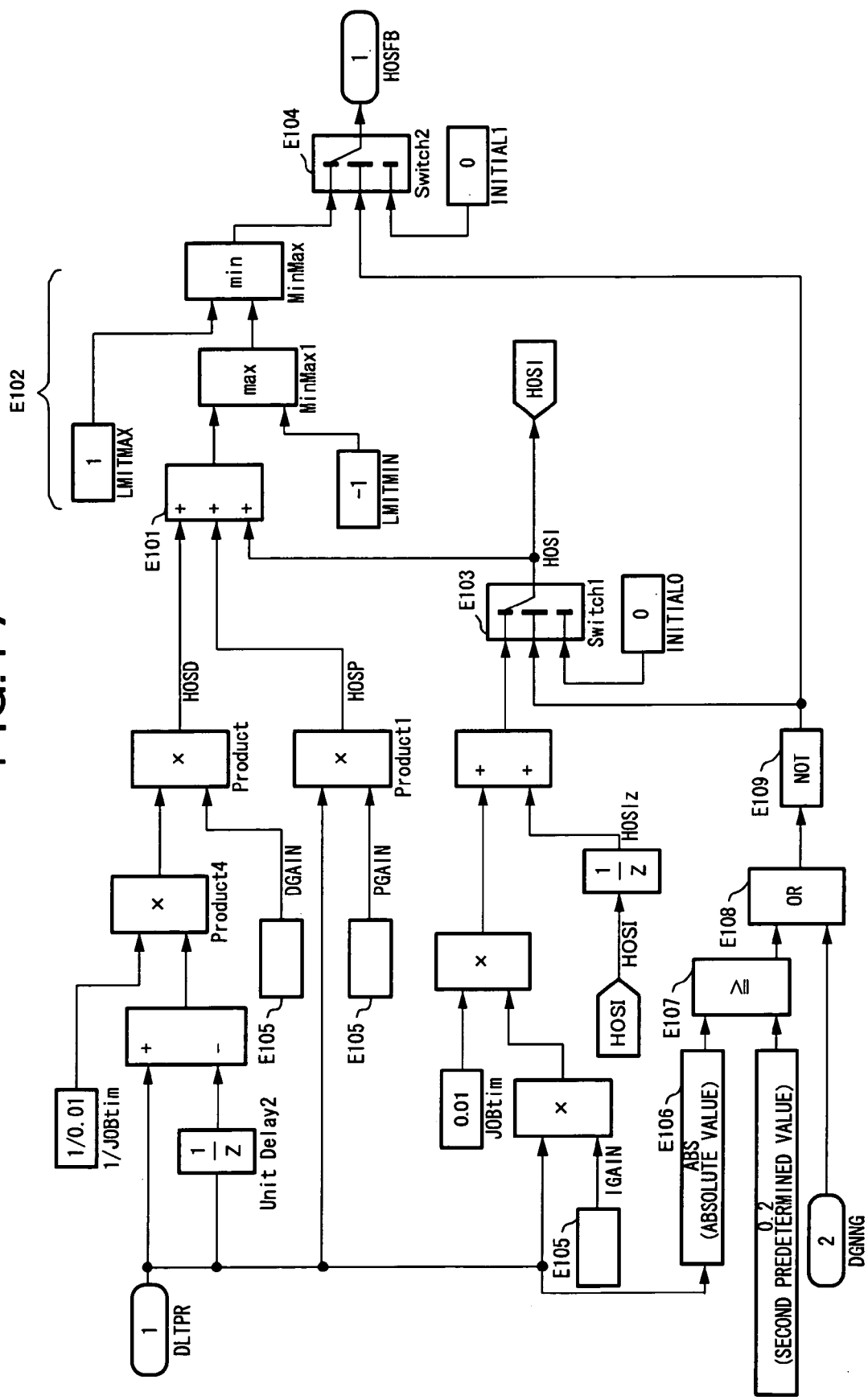
FIG. 17 is a block diagram showing the detail of a feedback control section E.

The detail of feedback control section E is shown in FIG. 17.

In feedback control section E, the feedback correction amount HOSFB is set by the proportion plus integral plus derivative action based on the deviation DLTPR.

Namely, a derivative operation amount HOSD is computed based on a derivative value of the deviation DLTPR and a derivative gain DGAIN, a proportion operating amount HOSP is computed based on the deviation DLTPR and a proportion gain PGAIN, and a previous integral operation amount HOLIz is corrected based on the deviation DLTPR and an integral gain IGAIN, thereby updating an integral operation amount HOSI.

Then, the derivative operation amount HOSD, the proportional operation amount HOSP and the integral operation amount HOSI are added together, in an adding section E101. Thereafter, an addition output of adding section E101 is limited within a range between a maximum value (=1) and a minimum value (=−1), in a limiter section E102, and the limitation result is output as the feedback correction amount HOSFB.

Figure 22:
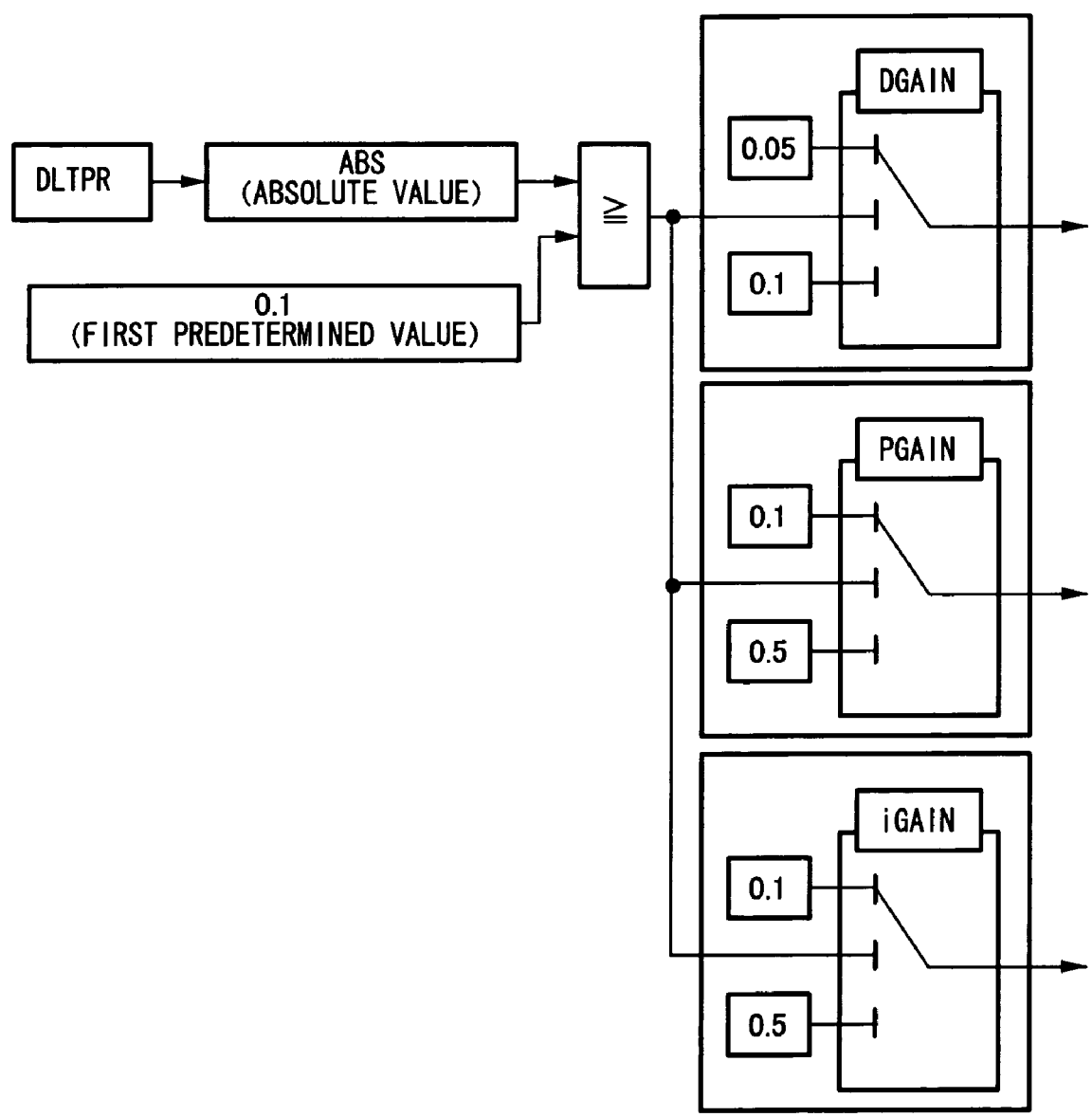
FIG. 22 is a block diagram showing the detail of a gain setting section E105 in the feedback control section E.

Here, the derivative gain DGAIN, the proportion gain PGAIN and the integral gain IGAIN are set in a gain setting section E105 shown in FIG. 22.

In gain setting section E105, an absolute value of the deviation DLTPR is compared with a first predetermined value (for example, 0.1).

In the case where $|DLTPR|\geq$first predetermined value, and also the detection value of the intake pressure is regarded to contain a minor abnormality, between previously set large and small gains, the small gain is output as each of the derivative gain DGAIN, the proportion gain PGAIN and the integral gain IGAIN. Thus, the degree of the correction based on the deviation DLTPR is lowered.

On the other hand, if $|DLTPR|<$first predetermined value, it is judged that the intake pressure detection value is normal, the large gain is output as each of the derivative gain DGAIN, the proportion gain PGAIN and the integral gain IGAIN. As a result, the feedback control based on the deviation DLTPR is performed at a high response.

Further, in the case where the correction based on the feedback correction amount HOSFB is inhibited, a selecting section E103 resets the integral operation amount HOSI to "0", and further, a selecting section E104 outputs the feedback correction amount HOSFB as "0".

Moreover, the absolute value of the deviation DLTPR is computed in an absolute value computing section E106, and it is judged in a comparing section E107 whether or not the absolute value of the deviation DLTPR is equal to or larger than a second predetermined value (for example, 0.2).

Then, if $|DLTPR|\geq$second predetermined value, comparing section E107 outputs "1".

The output of comparing section E107 and the diagnosis information signal DGNNG are input to an OR circuit E108, and "1" is output from OR circuit E108 in the case where $|DLTPR|\geq$second predetermined value and/or an occurrence of failure is diagnosed in detection and diagnosis section G.

The output of OR circuit E108 is inverted by an inversion circuit E109, and the correction is inhibited when the inversion result is "0", whereas the correction is permitted when the inversion result is "1".

Namely, in selecting section E103 to which the output of inversion circuit E109 is input, the integral operation amount HOSI is reset to "0" when the output of inversion circuit E109 is "0". Further, in selecting section E104 to which the output of inversion circuit E109 is input, the feedback correction amount HOSFB is output as "0" when the output of inversion circuit E109 is "0".

Accordingly, in the case where the occurrence of failure is not diagnosed in detection and diagnosis section G, and also $|DLTPR|<$second predetermined value, the correction based on the feedback correction amount HOSFB is executed.

However, even if $|DLTPR|<$second predetermined value, when first predetermined value $\leq|DLTPR|<$second predetermined value, the correction based on the feedback correction amount HOSFB is executed after a feedback gain is made smaller than that at the normal time.

According to the above configuration, when the intake pressure indicates an abnormal value due to an influence by the valve deposit or the like, it is possible to execute the feedback control while avoiding an erroneous correction control.

Figure 18:
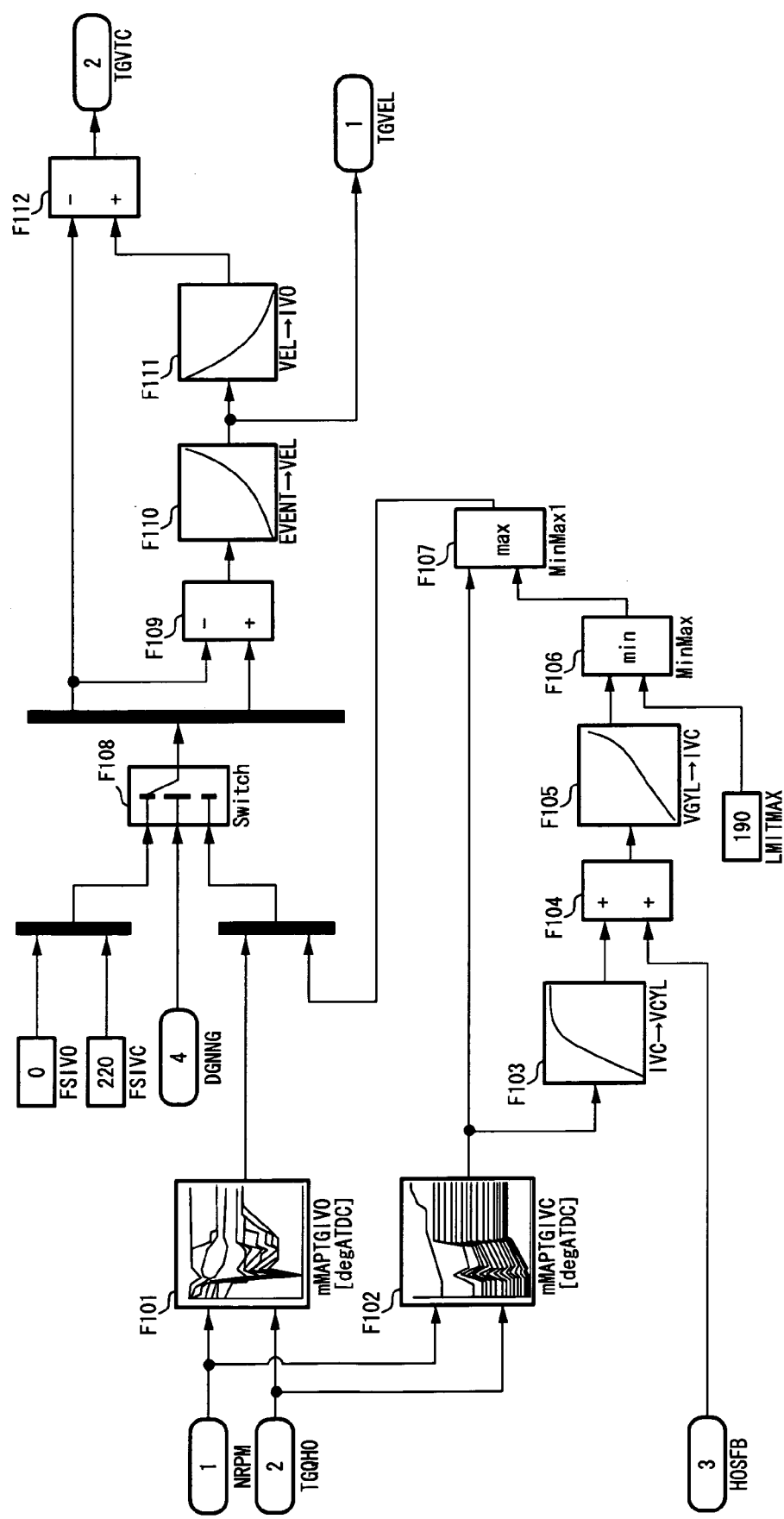
FIG. 18 is a block diagram showing the detail of a target VEL and VTC computing section F.

The detail of target VEL and VTC computing section F is shown in FIG. 18.

In a target IVO computing section F101, target opening timing IVO of intake valve 105 is computed, based on the engine rotation speed NRPM and the target volumetric flow ratio TGQH0.

Further, in a target IVC computing section F102, target closing timing IVC of intake valve 105 is computed, based on the engine rotation speed NRPM and the target volumetric flow ratio TGQH0.

Note, in above computing sections F101 and F102, the target opening timing IVO and the target closing timing IVC, at which the target volumetric flow ratio TGQH0 can be obtained in the target manifold pressure ratio TGPM state, are set.

In a cylinder filling intake air amount computing section F103, an air amount rate capable to be actually filled in a cylinder is computed, based on the target closing timing IVC.

In a correcting section F104, the air amount rate obtained in computing section F103 is corrected based on the feedback correction amount HOSFB.

Here, the feedback correction amount HOSFB is set to "0" when the detection value of intake pressure sensor 133 is abnormal. Accordingly, the correction in correcting section F104 is inhibited when the detection value of intake pressure sensor 133 is abnormal.

In an IVC conversion section F105, the air amount rate corrected based on the feedback correction amount HOSFB is converted into the target closing timing IVC.

In a selecting section F106, from the target closing timing IVC obtained in IVC conversion section F105 and a maximum value, the smaller one is selected, thereby limiting the target closing timing IVC within the maximum value.

Further, in selecting section F107, from the target closing timing IVC computed in target IVC computing section F102 and the target closing timing IVC passed through selecting section F106, the larger one (retarded side) is selected.

A selecting section F108 receives the target opening timing IVO and the target closing timing IVC obtained as in the above manner, and also receives previously stored fixed opening timing FSIVO and previously stored fixed closing timing FSIVC.

Note, the fixed opening timing FSIVO and the fixed closing timing FSIVC are set to correspond to the opening characteristic in the case where any variable valve mechanism such as VEL mechanism 112, VTC mechanism 113 or the like, is not provided, and intake valve 105 is driven by a cam with a constant opening characteristic.

Then, selecting section F108 outputs the target opening timing IVO and the target closing timing IVC which are calculated based on the engine rotation speed NRPM and the target volumetric flow ratio TGQH0, when it is judged based on the diagnosis information signal DGNNG that intake pressure sensor 133 is normal.

On the other hand, when it is judged based on the diagnosis information signal DGNNG that the detection value of intake pressure sensor 133 is abnormal, the fixed opening timing FSIVO and closing timing FSIVC are output.

The opening timing IVO and the closing timing IVC output from selecting section F108 are input to an operating angle computing section F109, where the operating angle of intake valve 105 is computed.

The operating angle is converted into the target angle TGVEL of control shaft 16 of VEL 112, in a VEL angle computing section F110, to be output. Then, DC servo motor 121 is feedback controlled so that an actual angle of control shaft 16 is coincident with the target angle TGVEL.

Further, in an IVO computing section F111, the opening timing IVO of intake valve 105 for when the center phase of intake valve 105 is most retarded, is computed based on the target angle TGVEL.

Then, in an advance amount computing section F112, a target advance amount TGVTC of VTC mechanism 113 is calculated as a difference between the opening timing IVO obtained in IVO computing section F111 and the target opening timing IVO output from selecting section F108.

Then, electromagnetic actuator 99 of VTC mechanism 113 is feedback controlled so that an actual advance value is coincident with the target advance amount TGVTC.

Figure 19:
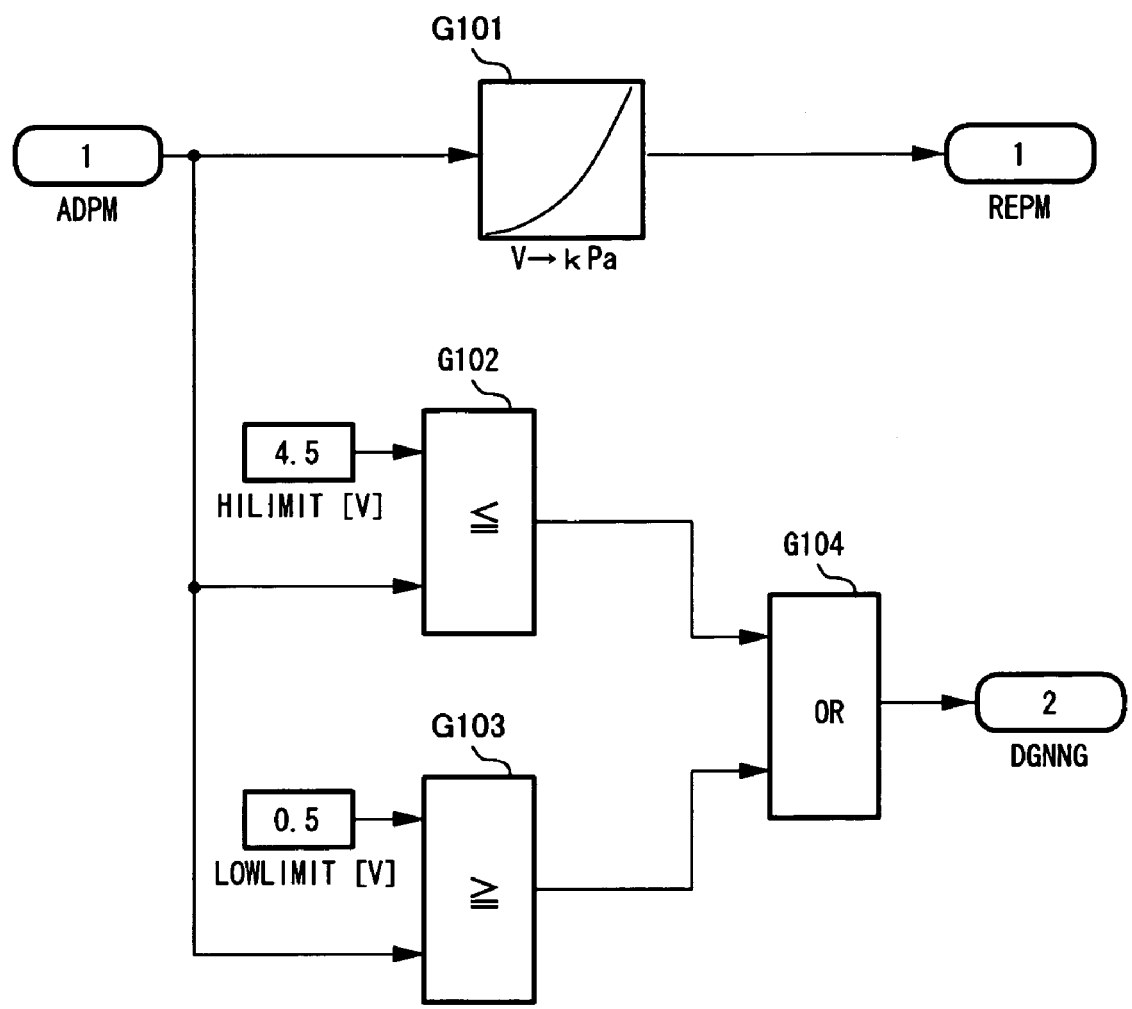
FIG. 19 is a block diagram showing the detail of a detection and diagnosis section G.

The detail of detecting and diagnosis section G is shown in FIG. 19.

In detecting and diagnosis section G, the output ADPM of intake pressure sensor 133 is converted into pressure data, in a conversion section G101.

On the other hand, in a first comparing section G102, it is judged whether or not an actual output ADPM is equal to or less than a previously stored minimum output, and if the actual output ADPM is equal to or less than the minimum output, "1" is output.

Further, in a second comparing section G103, it is judged whether or not the actual output ADPM is equal to or larger than a previously stored maximum output, and if the actual output ADPM is equal to or larger than the maximum output, "1" is output.

The outputs of first comparing section G102 and second comparing section G103 are output to an OR circuit G104.

Then, in OR circuit G104, when the actual output ADPM is equal to or less than the minimum output, or the actual output ADPM is equal to or larger than the maximum output, and also the output ADPM indicates an abnormal value, the diagnosis information signal DGNNG is output as "1". On the other hand, if the actual output ADPM is within a normal range between the minimum output and the maximum output, the diagnosis information signal DGNNG is output as "0".

Note, the failure diagnosis method of intake pressure sensor 133 is not limited to the above. For example, it is possible to compare the intake pressure estimated from the intake air amount detection value and the engine rotation speed, with the detection result of intake pressure sensor 133, thereby diagnosing the occurrence of failure.

According to the above configuration, when the intake pressure sensor 133 is normal, the opening of throttle valve 103b is controlled based on the target manifold pressure ratio (target intake pressure), and also the lift amount and valve timing of intake valve 105 are controlled based on the target volumetric flow ratio (requested intake air amount) and the deviation between the target manifold pressure ratio and the actual manifold pressure ratio.

On the other hand, if intake pressure sensor 133 is failed, the opening of throttle valve 103b is controlled based on only a request of target volumetric flow ratio (target intake air amount), and the lift amount and valve timing of intake valve 105 are fixed. Accordingly, it is possible to prevent the opening characteristic of intake valve 105 from being erroneously controlled based on an erroneous detection result of intake pressure sensor 133.

Further, when intake pressure sensor 133 is failed, since the opening characteristic of intake valve 105 is fixed and the volumetric flow ratio is adjusted to the target volumetric flow ratio (target intake air amount) by throttle valve 103b, it is possible to control the intake air amount according to an accelerating operation while generating a negative pressure.

Further, in the case where intake pressure sensor 133 is not failed but the detection value of the intake pressure indicates an abnormal value due to the influence of the valve deposit, it is possible to execute the feedback correction control while avoiding the erroneous correction.

Figure 20:
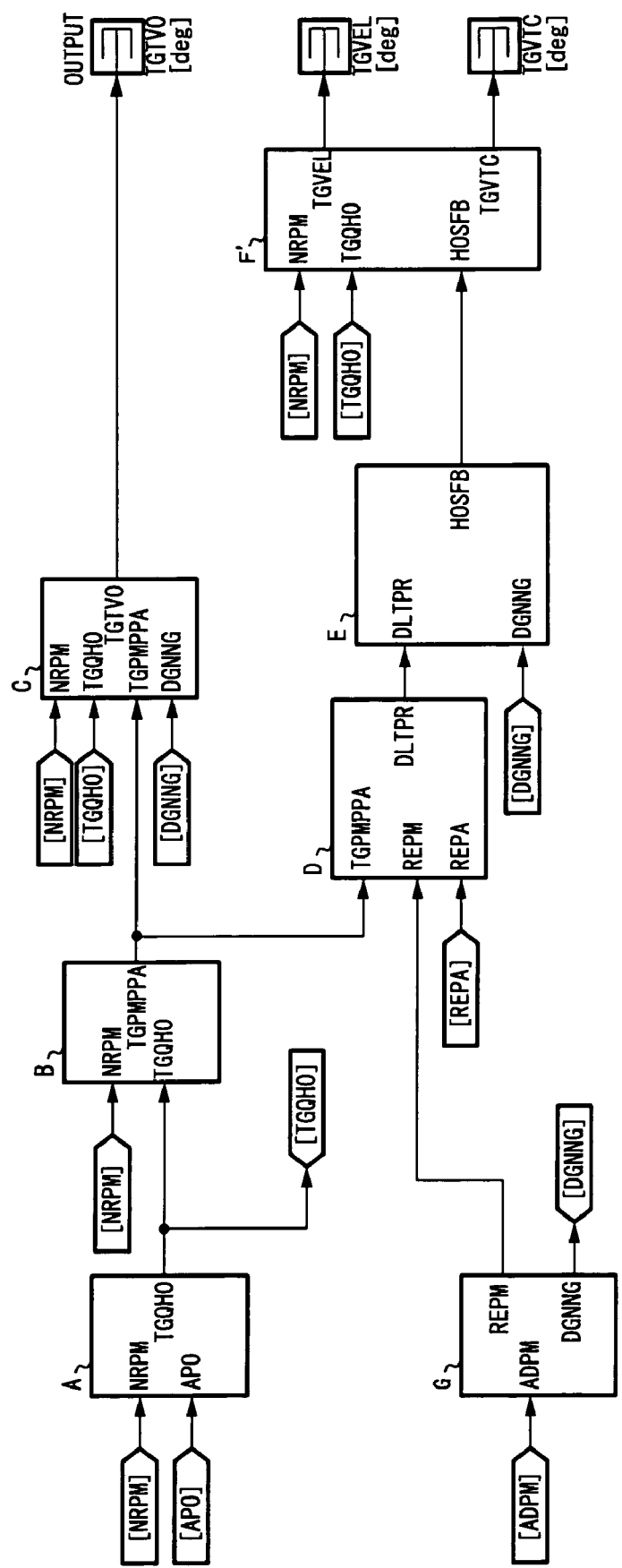
FIG. 20 is a block diagram showing controls of the electronically controlled throttle and the intake valve in a second embodiment of the invention.

FIG. 20 is a block diagram showing a second embodiment of the invention.

A configuration shown in FIG. 20 differs from the configuration in FIG. 12 only in a target VEL and VTC computing section F'.

Target VEL and VTC computing section F' shown in FIG. 20 receives the engine rotation speed NRPM, the target volumetric flow ratio TGQH0 computed in target volumetric flow ratio computing section A, and the feedback correction amount HOSFB computed in feedback control section E.

However, the diagnosis information signal DGNNG of intake pressure sensor 133 in detection and diagnosis section G is not input to target VEL and VTC computing section F'.

Figure 21:
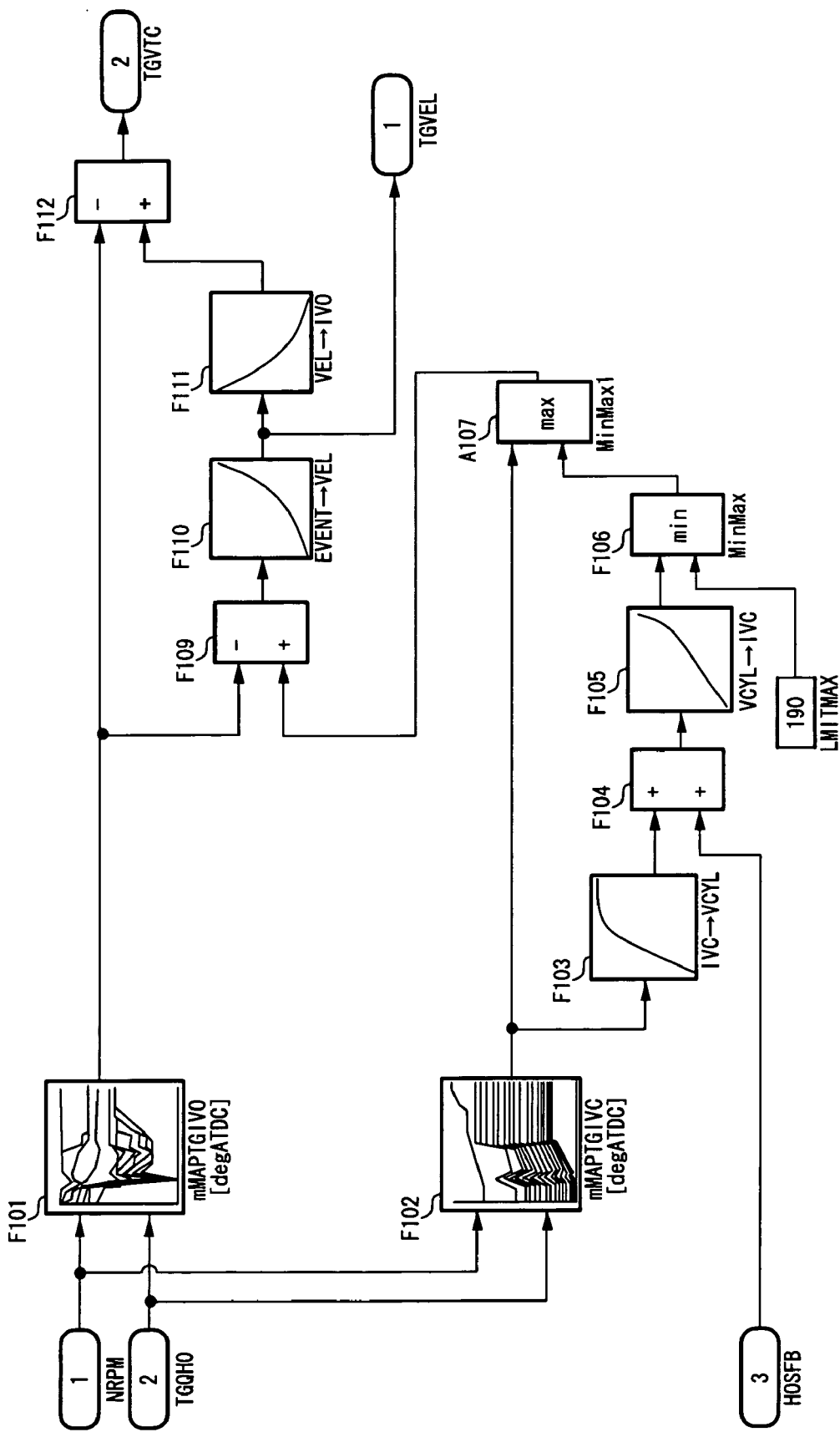
FIG. 21 is a block diagram showing the detail of a target VEL and VTC computing section F' in the second embodiment.

Then, in target VEL and VTC computing section F', according to a configuration as shown in FIG. 21, the control target TGVEL of VEL mechanism 112 and the control target TGVTC of VTC mechanism 113 are computed.

Namely, in target VEL and VTC computing section F' shown in FIG. 21, selecting section F108 in target VEL and VTC computing section F shown in FIG. 18 is omitted.

Then, when intake pressure sensor 133 is failed, the target angle TGVEL of control shaft 16 of VEL mechanism 112 and the control target TGVTC of VTC mechanism 113 are computed, based on the engine rotation speed NRPM, the target opening timing IVO computed based on the target volumetric flow ratio TGQH0, and the target closing timing IVC.

According to the above configuration, even if intake pressure sensor 133 is failed, the throttle control based on the target manifold pressure ratio, and the control of the opening and closing timing of intake valve 105 based on the target volumetric flow ratio, continue to be performed. However, since the closing timing correction based on the feedback correction amount HOSFB is inhibited, it is possible to avoid that the closing timing is erroneously controlled based on the intake pressure different from the actual intake pressure.

The entire contents of Japanese Patent Application No. 2004-075133 filed on Mar. 16, 2004, a priority of which is claimed, are incorporated herein by reference.

While only selected embodiments have been chosen to illustrate the present invention, it will be apparent to those skilled in the art from this disclosure that various changes and modifications can be made herein without departing from the scope of the invention as defined in the appended claims.

Furthermore, the foregoing description of the embodiments according to the present invention is provided for illustration only, and not for the purpose of limiting the invention as defined in the appended claims and their equivalents.

I claim:

1. An intake control apparatus for an internal combustion engine, comprising:
   an electronically controlled throttle;
   a variable valve mechanism varying an opening characteristic of an intake valve;
   a first computing section that computes a target intake pressure;
   a second computing section that computes a target intake air amount;
   a first control section that controls said electronically controlled throttle, to attain said target intake pressure;
   a second control section that controls said variable valve mechanism, to attain said target intake air amount;
   a detector detecting an intake pressure of said internal combustion engine;
   a correcting section that corrects the control by said second control section based on the intake pressure detected by said detector;
   a diagnosis section that judges whether or not the intake pressure detected by said detector is abnormal; and
   a limiting section that limits the correction by said correcting section when it is judged that the intake pressure detected by said detector is abnormal.

2. An intake control apparatus for an internal combustion engine according to claim 1,
   wherein said limiting section inhibits the correction by said correcting section.

3. An intake control apparatus for an internal combustion engine according to claim 1,
   wherein said correcting section computes the deviation between the intake pressure detected by said detector and said target intake pressure, and also computes an integral value of said deviation, to compute an operation amount for correcting the control by said second control section based on said integral value; and
   said limiting section resets said integral value and also inhibits said operation amount from being output.

4. An intake control apparatus for an internal combustion engine according to claim 1,
   wherein said limiting section reduces a degree of the correction by said correcting section.

5. An intake control apparatus for an internal combustion engine according to claim 4,
   wherein said correcting section computes the deviation between the intake pressure detected by said detector and said target intake pressure, to compute an operation amount for correcting the control by said second control section based on said deviation; and
   said limiting section changes a gain of said operation amount relative to said deviation to be smaller, when it is judged that the intake pressure detected by said detector is abnormal.

6. An intake control apparatus for an internal combustion engine according to claim 1,
   wherein said diagnosis section determines whether the abnormality of the intake pressure detected by said detector is the minor abnormality or the major abnormality; and
   said limiting section reduces a degree of the correction by said correcting section when said diagnosis section judges an occurrence of said minor abnormality, and inhibits the correction by said correcting section when said diagnosis section judges an occurrence of said major abnormality.

7. An intake control apparatus for an internal combustion engine, comprising:
   an electronically controlled throttle;
   a variable valve mechanism varying an opening characteristic of an intake valve;
   a first computing section that computes a target intake pressure;

a second computing section that computes a target intake air amount;

a first control section that controls said electronically controlled throttle, to attain said target intake pressure;

a second control section that controls said variable valve mechanism, to attain said target intake air amount;

a detector detecting an intake pressure of said internal combustion engine;

a correcting section that corrects the control by said second control section based on the intake pressure detected by said detector;

a diagnosis section that judges whether or not the intake pressure detected by said detector is abnormal;

a third control section that controls said electronically controlled throttle to attain said target intake air amount, in place of said first control section, when it is judged that the intake pressure detected by said detector is abnormal; and a fourth control section that controls said variable valve mechanism based on a fixed target opening characteristic, in place of said second control section, when it is judged that the intake pressure detected by said detector is abnormal.

8. An intake control apparatus for an internal combustion engine according to claim 7, wherein said first control section computes a target opening based on said target intake air amount, to correct said target opening based on said target intake pressure; and said third control section inhibits the correction of said target opening based on said target intake pressure.

9. An intake control apparatus for an internal combustion engine according to claim 7, wherein said second control section computes target opening timing and target closing timing of said intake valve based on said target intake air amount;

said correcting section corrects said target closing timing based on the intake pressure detected by said detector; and said fourth control section outputs, in place of said target opening timing and said target closing timing, previously stored fixed target opening timing and previously stored fixed target closing timing.

10. An intake control apparatus for an internal combustion engine, comprising:

an electronically controlled throttle;

a variable valve mechanism varying an opening characteristic of an intake valve;

first computing means for computing a target intake pressure;

second computing means for computing a target intake air amount;

first control means for controlling said electronically controlled throttle, to attain said target intake pressure;

second control means for controlling said variable valve mechanism, to attain said target intake air amount;

detecting means for detecting an intake pressure of said internal combustion engine;

correcting means for correcting the control by said second control means based on the intake pressure detected by said detecting means;

diagnosis means for judging whether or not the intake pressure detected by said detecting means is abnormal; and limiting means for limiting the correction by said correcting means when it is judged that the intake pressure detected by said detecting means is abnormal.

11. An intake control apparatus for an internal combustion engine, comprising:

an electronically controlled throttle;

a variable valve mechanism varying an opening characteristic of an intake valve;

first computing means for computing a target intake pressure;

second computing means for computing a target intake air amount;

first control means for controlling said electronically controlled throttle, to attain said target intake pressure;

second control means for controlling said variable valve mechanism, to attain said target intake air amount;

detecting means for detecting an intake pressure of said internal combustion engine;

correcting means for correcting the control by said second control means based on the intake pressure detected by said detecting means;

diagnosis means for judging whether or not the intake pressure detected by said detecting means is abnormal;

third control means for controlling said electronically controlled throttle to attain said target intake air amount, in place of said first control means, when it is judged that the intake pressure detected by said detecting means is abnormal; and fourth control means for controlling said variable valve mechanism based on a fixed target opening characteristic, in place of said second control means, when it is judged that the intake pressure detected by said detecting means is abnormal.

12. An intake control method for an internal combustion engine provided with an electronically controlled throttle and a variable valve mechanism varying an opening characteristic of an intake valve, comprising the steps of:

computing a target intake pressure;

computing a target intake air amount;

controlling said electronically controlled throttle, to attain said target intake pressure;

controlling said variable valve mechanism, to attain said target intake air amount;

detecting an intake pressure of said internal combustion engine;

correcting the control of said variable valve mechanism based on the detection value of said intake pressure;

judging whether or not the detection value of said intake pressure is abnormal; and limiting the correction of said variable valve mechanism when it is judged that the detection value of said intake pressure is abnormal.

13. An intake control method for an internal combustion engine according to claim 12, wherein said step of limiting the correction comprises the step of;

inhibiting the correction based on the detection value of said intake pressure when it is judged that the detection value of said intake pressure is abnormal.

14. An intake control method for an internal combustion engine according to claim 12, wherein said step of correcting the control of said variable valve mechanism comprises the steps of:

computing the deviation between the detection value of said intake pressure and said target intake pressure;

computing an integral value of said deviation; and computing an operation amount for correcting the control of said variable valve mechanism based on said integral value, and said step of limiting the correction comprises the steps of:

resetting said integral value; and inhibiting said operation amount from being output.

15. An intake control method for an internal combustion engine according to claim 12, wherein said step of limiting the correction comprises the step of;

reducing a degree of the correction based on the detection value of said intake pressure.

16. An intake control method for an internal combustion engine according to claim 15, wherein said step of correcting the control of said variable valve mechanism comprises the steps of:

computing the deviation between the detection value of said intake pressure and said target intake pressure; and computing an operation amount for correcting the control of said variable valve mechanism based on said deviation, and said step of limiting the correction comprises the step of;

changing a gain of said operation amount relative to said deviation to be smaller, when it is judged that the detection value of said intake pressure is abnormal.

17. An intake control method for an internal combustion engine according to claim 12, wherein said step of judging whether or not the detection value of said intake pressure is abnormal comprises the step of;

determining whether the abnormality of the detection value of said intake pressure is the minor abnormality or the major abnormality, and said step of limiting the correction comprises the steps of:

reducing a degree of the correction based on the detection value of said intake pressure when an occurrence of said minor abnormality is judged; and inhibiting the correction based on the detection value of said intake pressure when an occurrence of said major abnormality is judged.

18. An intake control method for an internal combustion engine provided with an electronically controlled throttle and a variable valve mechanism varying an opening characteristic of an intake valve, comprising the steps of:

computing a target intake pressure;

computing a target intake air amount;

controlling said electronically controlled throttle, to attain said target intake pressure;

controlling said variable valve mechanism, to attain said target intake air amount;

detecting an intake pressure of said internal combustion engine;

correcting the control of said variable valve mechanism based on the detection value of said intake pressure;

judging whether or not the detection value of said intake pressure is abnormal;

controlling said electronically controlled throttle to attain said target intake air amount, when it is judged that the detection value of said intake pressure is abnormal; and controlling said variable valve mechanism based on a fixed target opening characteristic, when it is judged that the detection value of said intake pressure is abnormal.

19. An intake control method for an internal combustion engine according to claim 18, wherein said step of controlling said electronically controlled throttle to attain said target intake pressure, comprises the steps of:

computing a target opening based on said target intake air amount; and correcting said target opening based on said target intake pressure, and said step of controlling said electronically controlled throttle to attain said target intake air amount when it is judged that the detection value of said intake pressure is abnormal, comprises the step of;

inhibiting the correction of said target opening based on said target intake pressure.

20. An intake control apparatus for an internal combustion engine according to claim 18, wherein said step of controlling said variable valve mechanism to attain said target intake air amount, comprises the step of;

computing target opening timing and target closing timing of said intake valve based on said target intake air amount, said step of correcting the control of said variable valve mechanism comprises the step of;

correcting said target closing timing based on the detection value of said intake pressure, and said step of controlling said variable valve mechanism based on the fixed target opening characteristic when it is judged that the detection value of said intake pressure is abnormal, comprises the step of;

outputting, in place of said target opening timing and said target closing timing, previously stored fixed target opening timing and previously stored fixed closing timing.

* * * * *